US008981906B2

(12) United States Patent
Takeoka et al.

(10) Patent No.: US 8,981,906 B2

(45) Date of Patent: Mar. 17, 2015

(54) PRINTED WIRING BOARD AND WIRELESS COMMUNICATION SYSTEM

(75) Inventors: Makoto Takeoka, Nagaokakyo (JP); Koji Shiroki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 230 days.

(21) Appl. No.: 13/616,140

(22) Filed: Sep. 14, 2012

(65) Prior Publication Data

US 2013/0002404 A1 Jan. 3, 2013

Related U.S. Application Data

(63) Continuation of application No. PCT/JP2011/068110, filed on Aug. 9, 2011.

(30) Foreign Application Priority Data

Aug. 10, 2010 (JP) ................................. 2010-179638

(51) Int. Cl.

| | |
|---|---|
| ***G06K 7/01*** | (2006.01) |
| ***H01Q 1/22*** | (2006.01) |
| ***H01Q 1/38*** | (2006.01) |
| ***H01Q 1/52*** | (2006.01) |
| ***H01Q 5/00*** | (2006.01) |
| ***H01Q 9/28*** | (2006.01) |

(52) U.S. Cl.

CPC ............... *H01Q 1/2225* (2013.01); *H01Q 1/38* (2013.01); *H01Q 1/52* (2013.01); *H01Q 5/0017* (2013.01); *H01Q 5/0058* (2013.01); *H01Q 9/285* (2013.01)

USPC .................... 340/10.1; 340/572.7; 340/572.8; 343/795; 343/904; 343/751; 343/846; 343/834; 235/435; 235/492; 257/670

(58) Field of Classification Search

USPC .......... 340/10.1, 572.7–8; 343/795, 904, 751, 343/846, 834; 235/435, 492; 257/670

See application file for complete search history.

(56) References Cited

U.S. PATENT DOCUMENTS

| | | | |
|---|---|---|---|
| 3,364,564 | A | 1/1968 | Kurtz et al. |
| 4,794,397 | A | 12/1988 | Ohe et al. |
| 5,232,765 | A | 8/1993 | Yano et al. |

(Continued)

FOREIGN PATENT DOCUMENTS

| | | | |
|---|---|---|---|
| CA | 2 279 176 | A1 | 7/1998 |
| DE | 10 2006 057 369 | A1 | 6/2008 |

(Continued)

OTHER PUBLICATIONS

Official communication issued in Japanese Application No. 2007-531524, mailed on Sep. 11, 2007.

(Continued)

*Primary Examiner* — Curtis King
*Assistant Examiner* — Chico A Foxx
(74) *Attorney, Agent, or Firm* — Keating & Bennett, LLP

(57) ABSTRACT

A printed wiring board includes a circuit substrate on which sheets are laminated, a wireless IC element provided on the sheet, a radiator provided on the sheet, and a loop-shaped electrode defined by first planar conductors, via hole conductors, and one side of the radiator, coupled to the wireless IC element. The first planar conductors are coupled to the radiator and the second planar conductors by auxiliary electrodes.

20 Claims, 9 Drawing Sheets

(56) References Cited

U.S. PATENT DOCUMENTS

| | | | | |
|---|---|---|---|---|
| 5,253,969 | A | 10/1993 | Richert | |
| 5,337,063 | A | 8/1994 | Takahira | |
| 5,374,937 | A | 12/1994 | Tsunekawa et al. | |
| 5,399,060 | A | 3/1995 | Richert | |
| 5,491,483 | A | 2/1996 | D'Hont | |
| 5,528,222 | A | 6/1996 | Moskowitz et al. | |
| 5,757,074 | A | 5/1998 | Matloubian et al. | |
| 5,854,480 | A | 12/1998 | Noto | |
| 5,903,239 | A | 5/1999 | Takahashi et al. | |
| 5,936,150 | A | 8/1999 | Kobrin et al. | |
| 5,955,723 | A | 9/1999 | Reiner | |
| 5,995,006 | A | 11/1999 | Walsh | |
| 6,104,311 | A | 8/2000 | Lastinger | |
| 6,107,920 | A | 8/2000 | Eberhardt et al. | |
| 6,172,608 | B1 | 1/2001 | Cole | |
| 6,181,287 | B1 | 1/2001 | Beigel | |
| 6,190,942 | B1 | 2/2001 | Wilm et al. | |
| 6,243,045 | B1 | 6/2001 | Ishibashi | |
| 6,249,258 | B1 | 6/2001 | Bloch et al. | |
| 6,259,369 | B1 | 7/2001 | Monico | |
| 6,271,803 | B1 | 8/2001 | Watanabe et al. | |
| 6,335,686 | B1 | 1/2002 | Goff et al. | |
| 6,362,784 | B1 | 3/2002 | Kane et al. | |
| 6,367,143 | B1 | 4/2002 | Sugimura | |
| 6,378,774 | B1 | 4/2002 | Emori et al. | |
| 6,406,990 | B1 | 6/2002 | Kawai | |
| 6,448,874 | B1 | 9/2002 | Shiino et al. | |
| 6,452,563 | B1 | 9/2002 | Porte | |
| 6,462,716 | B1 | 10/2002 | Kushihi | |
| 6,542,050 | B1 | 4/2003 | Arai et al. | |
| 6,600,459 | B2 | 7/2003 | Yokoshima et al. | |
| 6,634,564 | B2 | 10/2003 | Kuramochi | |
| 6,664,645 | B2 | 12/2003 | Kawai | |
| 6,763,254 | B2 | 7/2004 | Nishikawa | |
| 6,812,707 | B2 | 11/2004 | Yonezawa et al. | |
| 6,828,881 | B2 | 12/2004 | Mizutani et al. | |
| 6,837,438 | B1 | 1/2005 | Takasugi et al. | |
| 6,861,731 | B2 | 3/2005 | Buijsman et al. | |
| 6,927,738 | B2 | 8/2005 | Senba et al. | |
| 6,956,481 | B1 | 10/2005 | Cole | |
| 6,963,729 | B2 | 11/2005 | Uozumi | |
| 7,088,249 | B2 | 8/2006 | Senba et al. | |
| 7,088,307 | B2 | 8/2006 | Imaizumi | |
| 7,112,952 | B2 | 9/2006 | Arai et al. | |
| 7,119,693 | B1 | 10/2006 | Devilbiss | |
| 7,129,834 | B2 | 10/2006 | Naruse et al. | |
| 7,248,221 | B2 | 7/2007 | Kai et al. | |
| 7,250,910 | B2 | 7/2007 | Yoshikawa et al. | |
| 7,276,929 | B2 | 10/2007 | Arai et al. | |
| 7,317,396 | B2 | 1/2008 | Ujino | |
| 7,405,664 | B2 | 7/2008 | Sakama et al. | |
| 8,177,138 | B2 * | 5/2012 | Kato et al. | 235/492 |
| 2001/0011012 | A1 | 8/2001 | Hino et al. | |
| 2002/0011967 | A1 | 1/2002 | Goff et al. | |
| 2002/0015002 | A1 | 2/2002 | Yasukawa et al. | |
| 2002/0044092 | A1 | 4/2002 | Kushihi | |
| 2002/0067316 | A1 | 6/2002 | Yokoshima et al. | |
| 2002/0093457 | A1 | 7/2002 | Hamada et al. | |
| 2003/0006901 | A1 | 1/2003 | Kim et al. | |
| 2003/0020661 | A1 | 1/2003 | Sato | |
| 2003/0045324 | A1 | 3/2003 | Nagumo et al. | |
| 2003/0169153 | A1 | 9/2003 | Muller | |
| 2004/0001027 | A1 | 1/2004 | Killen et al. | |
| 2004/0026519 | A1 | 2/2004 | Usami et al. | |
| 2004/0056823 | A1 | 3/2004 | Zuk et al. | |
| 2004/0066617 | A1 | 4/2004 | Hirabayashi et al. | |
| 2004/0217915 | A1 | 11/2004 | Imaizumi | |
| 2004/0219956 | A1 | 11/2004 | Iwai et al. | |
| 2004/0227673 | A1 | 11/2004 | Iwai et al. | |
| 2004/0252064 | A1 | 12/2004 | Yuanzhu | |
| 2005/0001031 | A1 | 1/2005 | Akiho et al. | |
| 2005/0092836 | A1 | 5/2005 | Kudo | |
| 2005/0099337 | A1 | 5/2005 | Takei et al. | |
| 2005/0125093 | A1 | 6/2005 | Kikuchi et al. | |
| 2005/0134460 | A1 | 6/2005 | Usami | |
| 2005/0134506 | A1 | 6/2005 | Egbert | |
| 2005/0138798 | A1 | 6/2005 | Sakama et al. | |
| 2005/0140512 | A1 | 6/2005 | Sakama et al. | |
| 2005/0232412 | A1 | 10/2005 | Ichihara et al. | |
| 2005/0236623 | A1 | 10/2005 | Takechi et al. | |
| 2005/0275539 | A1 | 12/2005 | Sakama et al. | |
| 2006/0001138 | A1 | 1/2006 | Sakama et al. | |
| 2006/0032926 | A1 | 2/2006 | Baba et al. | |
| 2006/0044192 | A1 | 3/2006 | Egbert | |
| 2006/0055531 | A1 | 3/2006 | Cook et al. | |
| 2006/0055601 | A1 | 3/2006 | Kameda et al. | |
| 2006/0071084 | A1 | 4/2006 | Detig et al. | |
| 2006/0109185 | A1 | 5/2006 | Iwai et al. | |
| 2006/0145872 | A1 * | 7/2006 | Tanaka et al. | 340/572.8 |
| 2006/0158380 | A1 | 7/2006 | Son et al. | |
| 2006/0170606 | A1 | 8/2006 | Yamagajo et al. | |
| 2006/0214801 | A1 | 9/2006 | Murofushi et al. | |
| 2006/0220871 | A1 | 10/2006 | Baba et al. | |
| 2006/0244568 | A1 | 11/2006 | Tong et al. | |
| 2006/0244676 | A1 | 11/2006 | Uesaka | |
| 2006/0267138 | A1 | 11/2006 | Kobayashi | |
| 2007/0004028 | A1 | 1/2007 | Lair et al. | |
| 2007/0018893 | A1 | 1/2007 | Kai et al. | |
| 2007/0040028 | A1 * | 2/2007 | Kawamata | 235/435 |
| 2007/0052613 | A1 | 3/2007 | Gallschuetz et al. | |
| 2007/0057854 | A1 | 3/2007 | Oodachi et al. | |
| 2007/0069037 | A1 * | 3/2007 | Kawai | 235/492 |
| 2007/0132591 | A1 | 6/2007 | Khatri | |
| 2007/0164414 | A1 * | 7/2007 | Dokai et al. | 257/679 |
| 2007/0200782 | A1 | 8/2007 | Hayama et al. | |
| 2007/0229276 | A1 | 10/2007 | Yamagajo et al. | |
| 2007/0247387 | A1 | 10/2007 | Kubo et al. | |
| 2007/0252700 | A1 | 11/2007 | Ishihara et al. | |
| 2007/0252703 | A1 | 11/2007 | Kato et al. | |
| 2007/0252763 | A1 | 11/2007 | Martin | |
| 2007/0285335 | A1 | 12/2007 | Bungo et al. | |
| 2007/0290928 | A1 | 12/2007 | Chang et al. | |
| 2008/0024156 | A1 | 1/2008 | Arai et al. | |
| 2008/0068132 | A1 | 3/2008 | Kayanakis et al. | |
| 2008/0070003 | A1 | 3/2008 | Nakatani et al. | |
| 2008/0087990 | A1 | 4/2008 | Kato et al. | |
| 2008/0129606 | A1 | 6/2008 | Yanagisawa et al. | |
| 2008/0143630 | A1 * | 6/2008 | Kato et al. | 343/795 |
| 2008/0155822 | A1 * | 7/2008 | Finn | 29/832 |
| 2008/0169905 | A1 | 7/2008 | Slatter | |
| 2008/0184281 | A1 | 7/2008 | Ashizaki et al. | |
| 2008/0272885 | A1 | 11/2008 | Atherton | |
| 2009/0002130 | A1 | 1/2009 | Kato | |
| 2009/0009007 | A1 | 1/2009 | Kato et al. | |
| 2009/0021352 | A1 * | 1/2009 | Kataya et al. | 340/10.1 |
| 2009/0021446 | A1 | 1/2009 | Kataya et al. | |
| 2009/0065594 | A1 | 3/2009 | Kato et al. | |
| 2009/0096696 | A1 | 4/2009 | Joyce, Jr. et al. | |
| 2009/0109034 | A1 | 4/2009 | Chen et al. | |
| 2009/0109102 | A1 | 4/2009 | Dokai et al. | |
| 2009/0140947 | A1 | 6/2009 | Sasagawa et al. | |
| 2009/0160719 | A1 | 6/2009 | Kato et al. | |
| 2009/0201116 | A1 | 8/2009 | Orihara | |
| 2009/0224061 | A1 | 9/2009 | Kato et al. | |
| 2009/0231106 | A1 | 9/2009 | Okamura | |
| 2009/0262041 | A1 | 10/2009 | Ikemoto et al. | |
| 2009/0266900 | A1 | 10/2009 | Ikemoto et al. | |
| 2009/0278687 | A1 | 11/2009 | Kato | |
| 2009/0284220 | A1 | 11/2009 | Toncich et al. | |
| 2009/0321527 | A1 | 12/2009 | Kato et al. | |
| 2010/0103058 | A1 | 4/2010 | Kato et al. | |
| 2010/0182210 | A1 | 7/2010 | Ryou et al. | |
| 2010/0231482 | A1 * | 9/2010 | Yoshida et al. | 343/904 |
| 2010/0283694 | A1 | 11/2010 | Kato | |
| 2010/0308118 | A1 | 12/2010 | Kataya et al. | |
| 2011/0031320 | A1 | 2/2011 | Kato et al. | |
| 2011/0063184 | A1 | 3/2011 | Furumura et al. | |
| 2011/0186641 | A1 | 8/2011 | Kato et al. | |
| 2011/0253795 | A1 | 10/2011 | Kato | |

FOREIGN PATENT DOCUMENTS

| | | | |
|---|---|---|---|
| EP | 0 694 874 | A2 | 1/1996 |
| EP | 0 848 448 | A2 | 6/1998 |

(56) References Cited

FOREIGN PATENT DOCUMENTS

| | | | |
|---|---|---|---|
| EP | 0 948 083 | A2 | 10/1999 |
| EP | 0 977 145 | A2 | 2/2000 |
| EP | 1 010 543 | A1 | 6/2000 |
| EP | 1 085 480 | A1 | 3/2001 |
| EP | 1 160 915 | A2 | 12/2001 |
| EP | 1 170 795 | A2 | 1/2002 |
| EP | 1 193 793 | A2 | 4/2002 |
| EP | 1 227 540 | A1 | 7/2002 |
| EP | 1 280 232 | A1 | 1/2003 |
| EP | 1 280 350 | A1 | 1/2003 |
| EP | 1 343 223 | A1 | 9/2003 |
| EP | 1 357 511 | A2 | 10/2003 |
| EP | 1 547 753 | A1 | 6/2005 |
| EP | 1 548 872 | A1 | 6/2005 |
| EP | 1 626 364 | A2 | 2/2006 |
| EP | 1 701 296 | A1 | 9/2006 |
| EP | 1 703 589 | A1 | 9/2006 |
| EP | 1 742 296 | A1 | 1/2007 |
| EP | 1 744 398 | A1 | 1/2007 |
| EP | 1 840 802 | A1 | 10/2007 |
| EP | 1 841 005 | A1 | 10/2007 |
| EP | 1 865 574 | A1 | 12/2007 |
| EP | 1 887 652 | A1 | 2/2008 |
| EP | 1 976 056 | A1 | 10/2008 |
| EP | 1 988 491 | A1 | 11/2008 |
| EP | 1 988 601 | A1 | 11/2008 |
| EP | 1 993 170 | A1 | 11/2008 |
| EP | 2 009 738 | A1 | 12/2008 |
| EP | 2 012 258 | A1 | 1/2009 |
| EP | 2 096 709 | A1 | 9/2009 |
| EP | 2 148 449 | A1 | 1/2010 |
| EP | 2 166 617 | A1 | 3/2010 |
| EP | 2 251 934 | A1 | 11/2010 |
| EP | 2 256 861 | A1 | 12/2010 |
| EP | 2 330 684 | A1 | 6/2011 |
| GB | 2 305 075 | A | 3/1997 |
| GB | 2461443 | A | 1/2010 |
| JP | 50-143451 | A | 11/1975 |
| JP | 61-284102 | A | 12/1986 |
| JP | 62-127140 | U | 8/1987 |
| JP | 01-212035 | A | 8/1989 |
| JP | 02-164105 | A | 6/1990 |
| JP | 02-256208 | A | 10/1990 |
| JP | 3-171385 | A | 7/1991 |
| JP | 03-503467 | A | 8/1991 |
| JP | 03-262313 | A | 11/1991 |
| JP | 04-150011 | A | 5/1992 |
| JP | 04-167500 | A | 6/1992 |
| JP | 04-096814 | U | 8/1992 |
| JP | 04-101168 | U | 9/1992 |
| JP | 04-134807 | U | 12/1992 |
| JP | 05-226926 | A | 9/1993 |
| JP | 05-327331 | A | 12/1993 |
| JP | 6-53733 | A | 2/1994 |
| JP | 06-077729 | A | 3/1994 |
| JP | 06-029215 | U | 4/1994 |
| JP | 06-177635 | A | 6/1994 |
| JP | 6-260949 | A | 9/1994 |
| JP | 07-183836 | A | 7/1995 |
| JP | 08-055725 | A | 2/1996 |
| JP | 08-056113 | A | 2/1996 |
| JP | 8-87580 | A | 4/1996 |
| JP | 08-88586 | A | 4/1996 |
| JP | 08-088586 | A | 4/1996 |
| JP | 08-176421 | A | 7/1996 |
| JP | 08-180160 | A | 7/1996 |
| JP | 08-279027 | A | 10/1996 |
| JP | 08-307126 | A | 11/1996 |
| JP | 08-330372 | A | 12/1996 |
| JP | 09-014150 | A | 1/1997 |
| JP | 09-035025 | A | 2/1997 |
| JP | 9-93029 | A | 4/1997 |
| JP | 09-093029 | A | 4/1997 |
| JP | 09-245381 | A | 9/1997 |
| JP | 09-252217 | A | 9/1997 |
| JP | 09-270623 | A | 10/1997 |
| JP | 09-284038 | A | 10/1997 |
| JP | 09-294374 | A | 11/1997 |
| JP | 9-512367 | A | 12/1997 |
| JP | 10-069533 | A | 3/1998 |
| JP | 10-69533 | A | 3/1998 |
| JP | 10-505466 | A | 5/1998 |
| JP | 10-171954 | A | 6/1998 |
| JP | 10-173427 | A | 6/1998 |
| JP | 10-193849 | A | 7/1998 |
| JP | 10-193851 | A | 7/1998 |
| JP | 10-242742 | A | 9/1998 |
| JP | 10-293828 | A | 11/1998 |
| JP | 10-334203 | A | 12/1998 |
| JP | 11-025244 | A | 1/1999 |
| JP | 10-039441 | A | 2/1999 |
| JP | 11-075329 | A | 3/1999 |
| JP | 11-085937 | A | 3/1999 |
| JP | 11-88241 | A | 3/1999 |
| JP | 11-102424 | A | 4/1999 |
| JP | 11-103209 | A | 4/1999 |
| JP | 11-149536 | A | 6/1999 |
| JP | 11-149537 | A | 6/1999 |
| JP | 11-149538 | A | 6/1999 |
| JP | 11-175678 | A | 7/1999 |
| JP | 11-219420 | A | 8/1999 |
| JP | 11-220319 | A | 8/1999 |
| JP | 11-282993 | A | 10/1999 |
| JP | 11-328352 | A | 11/1999 |
| JP | 11-331014 | A | 11/1999 |
| JP | 11-346114 | A | 12/1999 |
| JP | 11-515094 | A | 12/1999 |
| JP | 2000-21128 | A | 1/2000 |
| JP | 2000-021639 | A | 1/2000 |
| JP | 2000-022421 | A | 1/2000 |
| JP | 2000-059260 | A | 2/2000 |
| JP | 2000-085283 | A | 3/2000 |
| JP | 2000-090207 | A | 3/2000 |
| JP | 2000-132643 | A | 5/2000 |
| JP | 2000-137778 | A | 5/2000 |
| JP | 2000-137779 | A | 5/2000 |
| JP | 2000-137785 | A | 5/2000 |
| JP | 2000-148948 | A | 5/2000 |
| JP | 2000-172812 | A | 6/2000 |
| JP | 2000-209013 | A | 7/2000 |
| JP | 2000-222540 | A | 8/2000 |
| JP | 2000-510271 | A | 8/2000 |
| JP | 2000-242754 | A | 9/2000 |
| JP | 2000-243797 | A | 9/2000 |
| JP | 2000-251049 | A | 9/2000 |
| JP | 2000-261230 | A | 9/2000 |
| JP | 2000-276569 | A | 10/2000 |
| JP | 2000-286634 | A | 10/2000 |
| JP | 2000-286760 | A | 10/2000 |
| JP | 2000-311226 | A | 11/2000 |
| JP | 2000-321984 | A | 11/2000 |
| JP | 2000-349680 | A | 12/2000 |
| JP | 2001-10264 | A | 1/2001 |
| JP | 2001-028036 | A | 1/2001 |
| JP | 2001-043340 | A | 2/2001 |
| JP | 3075400 | U | 2/2001 |
| JP | 2001-66990 | A | 3/2001 |
| JP | 2001-76111 | A | 3/2001 |
| JP | 2001-084463 | A | 3/2001 |
| JP | 2001-101369 | A | 4/2001 |
| JP | 2001-505682 | A | 4/2001 |
| JP | 2001-168628 | A | 6/2001 |
| JP | 2001-188890 | A | 7/2001 |
| JP | 2001-209767 | A | 8/2001 |
| JP | 2001-240046 | A | 9/2001 |
| JP | 2001-240217 | A | 9/2001 |
| JP | 2001-256457 | A | 9/2001 |
| JP | 2001-257292 | A | 9/2001 |
| JP | 2001-514777 | A | 9/2001 |
| JP | 2001-291181 | A | 10/2001 |
| JP | 2001-319380 | A | 11/2001 |
| JP | 2001-331976 | A | 11/2001 |
| JP | 2001-332923 | A | 11/2001 |
| JP | 2001-339226 | A | 12/2001 |

(56) References Cited

FOREIGN PATENT DOCUMENTS

| | | | |
|---|---|---|---|
| JP | 2001-344574 | A | 12/2001 |
| JP | 2001-351083 | A | 12/2001 |
| JP | 2001-351084 | A | 12/2001 |
| JP | 2001-352176 | A | 12/2001 |
| JP | 2001-358527 | A | 12/2001 |
| JP | 2002-024776 | A | 1/2002 |
| JP | 2002-026513 | A | 1/2002 |
| JP | 2002-32731 | A | 1/2002 |
| JP | 2002-042076 | A | 2/2002 |
| JP | 2002-042083 | A | 2/2002 |
| JP | 2002-063557 | A | 2/2002 |
| JP | 2002-505645 | A | 2/2002 |
| JP | 2002-076750 | A | 3/2002 |
| JP | 2002-76750 | A | 3/2002 |
| JP | 2002-111363 | A | 4/2002 |
| JP | 2002-150245 | A | 5/2002 |
| JP | 2002-157564 | A | 5/2002 |
| JP | 2002-158529 | A | 5/2002 |
| JP | 2002-175508 | A | 6/2002 |
| JP | 2002-175920 | A | 6/2002 |
| JP | 2002-183676 | A | 6/2002 |
| JP | 2002-183690 | A | 6/2002 |
| JP | 2002-185358 | A | 6/2002 |
| JP | 2002-204117 | A | 7/2002 |
| JP | 2002-521757 | A | 7/2002 |
| JP | 2002-522849 | A | 7/2002 |
| JP | 2002-222398 | A | 8/2002 |
| JP | 2002-230128 | A | 8/2002 |
| JP | 2002-232221 | A | 8/2002 |
| JP | 2002-246828 | A | 8/2002 |
| JP | 2002-252117 | A | 9/2002 |
| JP | 2002-259934 | A | 9/2002 |
| JP | 2002-280821 | A | 9/2002 |
| JP | 2002-298109 | A | 10/2002 |
| JP | 2002-308437 | A | 10/2002 |
| JP | 2002-319008 | A | 10/2002 |
| JP | 2002-319009 | A | 10/2002 |
| JP | 2002-319812 | A | 10/2002 |
| JP | 2002-362613 | A | 12/2002 |
| JP | 2002-366917 | A | 12/2002 |
| JP | 2002-373029 | A | 12/2002 |
| JP | 2002-373323 | A | 12/2002 |
| JP | 2002-374139 | A | 12/2002 |
| JP | 2003-006599 | A | 1/2003 |
| JP | 2003-016412 | A | 1/2003 |
| JP | 2003-022912 | A | 1/2003 |
| JP | 2003-026177 | A | 1/2003 |
| JP | 2003-030612 | A | 1/2003 |
| JP | 2003-037861 | A | 2/2003 |
| JP | 2003-44789 | A | 2/2003 |
| JP | 2003-046318 | A | 2/2003 |
| JP | 2003-58840 | A | 2/2003 |
| JP | 2003-067711 | A | 3/2003 |
| JP | 2003-069335 | A | 3/2003 |
| JP | 2003-076947 | A | 3/2003 |
| JP | 2003-76963 | A | 3/2003 |
| JP | 2003-78333 | A | 3/2003 |
| JP | 2003-078336 | A | 3/2003 |
| JP | 2003-085501 | A | 3/2003 |
| JP | 2003-085520 | A | 3/2003 |
| JP | 2003-87008 | A | 3/2003 |
| JP | 2003-87044 | A | 3/2003 |
| JP | 2003-099184 | A | 4/2003 |
| JP | 2003-099720 | A | 4/2003 |
| JP | 2003-099721 | A | 4/2003 |
| JP | 2003-110344 | A | 4/2003 |
| JP | 2003-132330 | A | 5/2003 |
| JP | 2003-134007 | A | 5/2003 |
| JP | 2003-155062 | A | 5/2003 |
| JP | 2003-158414 | A | 5/2003 |
| JP | 2003-168760 | A | 6/2003 |
| JP | 2003-179565 | A | 6/2003 |
| JP | 2003-187207 | A | 7/2003 |
| JP | 2003-187211 | A | 7/2003 |
| JP | 2003-188338 | A | 7/2003 |
| JP | 2003-188620 | A | 7/2003 |
| JP | 2003-198230 | A | 7/2003 |
| JP | 2003-209421 | A | 7/2003 |
| JP | 2003-216919 | A | 7/2003 |
| JP | 2003-218624 | A | 7/2003 |
| JP | 2003-233780 | A | 8/2003 |
| JP | 2003-242471 | A | 8/2003 |
| JP | 2003-243918 | A | 8/2003 |
| JP | 2003-249813 | A | 9/2003 |
| JP | 2003-529163 | A | 9/2003 |
| JP | 2003-288560 | A | 10/2003 |
| JP | 2003-309418 | A | 10/2003 |
| JP | 2003-317060 | A | 11/2003 |
| JP | 2003-331246 | A | 11/2003 |
| JP | 2003-332820 | A | 11/2003 |
| JP | 2003-536302 | A | 12/2003 |
| JP | 2004-040597 | A | 2/2004 |
| JP | 2004-505481 | A | 2/2004 |
| JP | 2004-082775 | A | 3/2004 |
| JP | 2004-88218 | A | 3/2004 |
| JP | 2004-93693 | A | 3/2004 |
| JP | 2004-096566 | A | 3/2004 |
| JP | 2004-096618 | A | 3/2004 |
| JP | 2004-126750 | A | 4/2004 |
| JP | 2004-127230 | A | 4/2004 |
| JP | 2004-140513 | A | 5/2004 |
| JP | 2004-145449 | A | 5/2004 |
| JP | 2004-163134 | A | 6/2004 |
| JP | 2004-213582 | A | 7/2004 |
| JP | 2004-519916 | A | 7/2004 |
| JP | 2004-234595 | A | 8/2004 |
| JP | 2004-253858 | A | 9/2004 |
| JP | 2004-527864 | A | 9/2004 |
| JP | 2004-280390 | A | 10/2004 |
| JP | 2004-282403 | A | 10/2004 |
| JP | 2004-287767 | A | 10/2004 |
| JP | 2004-295297 | A | 10/2004 |
| JP | 2004-297249 | A | 10/2004 |
| JP | 2004-297681 | A | 10/2004 |
| JP | 2004-304370 | A | 10/2004 |
| JP | 2004-319848 | A | 11/2004 |
| JP | 2004-326380 | A | 11/2004 |
| JP | 2004-334268 | A | 11/2004 |
| JP | 2004-336250 | A | 11/2004 |
| JP | 2004-343000 | A | 12/2004 |
| JP | 2004-362190 | A | 12/2004 |
| JP | 2004-362341 | A | 12/2004 |
| JP | 2004-362602 | A | 12/2004 |
| JP | 2005-5866 | A | 1/2005 |
| JP | 2005-18156 | A | 1/2005 |
| JP | 2005-033461 | A | 2/2005 |
| JP | 2005-064799 | A | 3/2005 |
| JP | 2005-124061 | A | 5/2005 |
| JP | 2005-128592 | A | 5/2005 |
| JP | 2005-129019 | A | 5/2005 |
| JP | 2005-134942 | A | 5/2005 |
| JP | 2005-135132 | A | 5/2005 |
| JP | 2005-136528 | A | 5/2005 |
| JP | 2005-137032 | A | 5/2005 |
| JP | 3653099 | B2 | 5/2005 |
| JP | 2005-165839 | A | 6/2005 |
| JP | 2005-167327 | A | 6/2005 |
| JP | 2005-167813 | A | 6/2005 |
| JP | 2005-190417 | A | 7/2005 |
| JP | 2005-191705 | A | 7/2005 |
| JP | 2005-192124 | A | 7/2005 |
| JP | 2005-204038 | A | 7/2005 |
| JP | 2005-210223 | A | 8/2005 |
| JP | 2005-210676 | A | 8/2005 |
| JP | 2005-210680 | A | 8/2005 |
| JP | 2005-217822 | A | 8/2005 |
| JP | 2005-229474 | A | 8/2005 |
| JP | 2005-236339 | A | 9/2005 |
| JP | 2005-244778 | A | 9/2005 |
| JP | 2005-252853 | A | 9/2005 |
| JP | 2005-275870 | A | 10/2005 |
| JP | 2005-277579 | A | 10/2005 |
| JP | 2005-284352 | A | 10/2005 |
| JP | 2005-284455 | A | 10/2005 |

(56) References Cited

FOREIGN PATENT DOCUMENTS

| | | | |
|---|---|---|---|
| JP | 2005-293537 | A | 10/2005 |
| JP | 2005-295135 | A | 10/2005 |
| JP | 2005-306696 | A | 11/2005 |
| JP | 2005-311205 | A | 11/2005 |
| JP | 2005-321305 | A | 11/2005 |
| JP | 2005-322119 | A | 11/2005 |
| JP | 2005-335755 | A | 12/2005 |
| JP | 2005-340759 | A | 12/2005 |
| JP | 2005-345802 | A | 12/2005 |
| JP | 2005-346820 | A | 12/2005 |
| JP | 2005-352858 | A | 12/2005 |
| JP | 2006-013976 | A | 1/2006 |
| JP | 2006-13976 | A | 1/2006 |
| JP | 2006-025390 | A | 1/2006 |
| JP | 2006-031766 | A | 2/2006 |
| JP | 2006-033312 | A | 2/2006 |
| JP | 2006-39902 | A | 2/2006 |
| JP | 2006-039947 | A | 2/2006 |
| JP | 2006-42059 | A | 2/2006 |
| JP | 2006-42097 | A | 2/2006 |
| JP | 2006-050200 | A | 2/2006 |
| JP | 2006-053833 | A | 2/2006 |
| JP | 2006-67479 | A | 3/2006 |
| JP | 2006-72706 | A | 3/2006 |
| JP | 2006-074348 | A | 3/2006 |
| JP | 2006-80367 | A | 3/2006 |
| JP | 2006-92630 | A | 4/2006 |
| JP | 2006-102953 | A | 4/2006 |
| JP | 2006-107296 | A | 4/2006 |
| JP | 2006-513594 | A | 4/2006 |
| JP | 2006-148462 | A | 6/2006 |
| JP | 2006-148518 | A | 6/2006 |
| JP | 2006-151402 | A | 6/2006 |
| JP | 2006-174151 | A | 6/2006 |
| JP | 2006-195795 | A | 7/2006 |
| JP | 2006-203187 | A | 8/2006 |
| JP | 2006-203852 | A | 8/2006 |
| JP | 2006-217000 | A | 8/2006 |
| JP | 2006-232292 | A | 9/2006 |
| JP | 2006-237674 | A | 9/2006 |
| JP | 2006-238282 | A | 9/2006 |
| JP | 2006-246372 | A | 9/2006 |
| JP | 2006-270212 | A | 10/2006 |
| JP | 2006-270681 | A | 10/2006 |
| JP | 2006-270766 | A | 10/2006 |
| JP | 2006-285911 | A | 10/2006 |
| JP | 2006-287659 | A | 10/2006 |
| JP | 2006-295879 | A | 10/2006 |
| JP | 2006-302219 | A | 11/2006 |
| JP | 2006-309401 | A | 11/2006 |
| JP | 2006-311239 | A | 11/2006 |
| JP | 2006-323481 | A | 11/2006 |
| JP | 2006-339964 | A | 12/2006 |
| JP | 2007-007888 | A | 1/2007 |
| JP | 2007-13120 | A | 1/2007 |
| JP | 2007-013120 | A | 1/2007 |
| JP | 2007-18067 | A | 1/2007 |
| JP | 2007-019905 | A | 1/2007 |
| JP | 2007-28002 | A | 2/2007 |
| JP | 2007-040702 | A | 2/2007 |
| JP | 2007-043535 | A | 2/2007 |
| JP | 2007-048126 | A | 2/2007 |
| JP | 2007-65822 | A | 3/2007 |
| JP | 2007-79687 | A | 3/2007 |
| JP | 2007-81712 | A | 3/2007 |
| JP | 2007-096655 | A | 4/2007 |
| JP | 2007-096768 | A | 4/2007 |
| JP | 2007-102348 | A | 4/2007 |
| JP | 2007-116347 | A | 5/2007 |
| JP | 2007-122542 | A | 5/2007 |
| JP | 2007-149757 | A | 6/2007 |
| JP | 2007-150642 | A | 6/2007 |
| JP | 2007-150868 | A | 6/2007 |
| JP | 2007-159083 | A | 6/2007 |
| JP | 2007-159129 | A | 6/2007 |
| JP | 2007-166133 | A | 6/2007 |
| JP | 3975918 | B2 | 6/2007 |
| JP | 2007-172369 | A | 7/2007 |
| JP | 2007-172527 | A | 7/2007 |
| JP | 2007-524942 | A | 8/2007 |
| JP | 2007-228254 | A | 9/2007 |
| JP | 2007-228325 | A | 9/2007 |
| JP | 2007-233597 | A | 9/2007 |
| JP | 2007-241789 | A | 9/2007 |
| JP | 2007-266999 | A | 10/2007 |
| JP | 2007-272264 | A | 10/2007 |
| JP | 2007-287128 | A | 11/2007 |
| JP | 2007-295177 | A | 11/2007 |
| JP | 2007-295557 | A | 11/2007 |
| JP | 2007-312350 | A | 11/2007 |
| JP | 2007-324865 | A | 12/2007 |
| JP | 2008-033716 | A | 2/2008 |
| JP | 2008-042910 | A | 2/2008 |
| JP | 2008-72243 | A | 3/2008 |
| JP | 2008-083867 | A | 4/2008 |
| JP | 2008-092131 | A | 4/2008 |
| JP | 2008-097426 | A | 4/2008 |
| JP | 2008-098993 | A | 4/2008 |
| JP | 4069958 | B2 | 4/2008 |
| JP | 2008-103691 | A | 5/2008 |
| JP | 2008-107947 | A | 5/2008 |
| JP | 2008-513888 | A | 5/2008 |
| JP | 2008-148345 | A | 6/2008 |
| JP | 2008-519347 | A | 6/2008 |
| JP | 2008-160821 | A | 7/2008 |
| JP | 2008-160874 | A | 7/2008 |
| JP | 2008-167190 | A | 7/2008 |
| JP | 2008-197714 | A | 8/2008 |
| JP | 2008-535372 | A | 8/2008 |
| JP | 2008-207875 | A | 9/2008 |
| JP | 2008-211572 | A | 9/2008 |
| JP | 2008-217406 | A | 9/2008 |
| JP | 2008-226099 | A | 9/2008 |
| JP | 2008-288915 | A | 11/2008 |
| JP | 2009-017284 | A | 1/2009 |
| JP | 2009-021970 | A | 1/2009 |
| JP | 2009-25870 | A | 2/2009 |
| JP | 2009-027291 | A | 2/2009 |
| JP | 2009-27291 | A | 2/2009 |
| JP | 2009-037413 | A | 2/2009 |
| JP | 2009-044647 | A | 2/2009 |
| JP | 2009-044715 | A | 2/2009 |
| JP | 3148168 | U | 2/2009 |
| JP | 2009-110144 | A | 5/2009 |
| JP | 2009-111986 | A | 5/2009 |
| JP | 2009-153166 | A | 7/2009 |
| JP | 2009-182630 | A | 8/2009 |
| JP | 2009-213169 | A | 9/2009 |
| JP | 2009-284182 | A | 12/2009 |
| JP | 2010-009196 | A | 1/2010 |
| JP | 2010-050844 | A | 3/2010 |
| JP | 2010-081571 | | 4/2010 |
| JP | 4609604 | B2 | 1/2011 |
| NL | 9100176 | A | 3/1992 |
| NL | 9100347 | A | 3/1992 |
| WO | 98/33142 | A1 | 7/1998 |
| WO | 99/67754 | A1 | 12/1999 |
| WO | 00/10122 | A2 | 2/2000 |
| WO | 01/95242 | A2 | 12/2001 |
| WO | 02/48980 | A1 | 6/2002 |
| WO | 02/061675 | A1 | 8/2002 |
| WO | 02/097723 | A1 | 12/2002 |
| WO | 03/079305 | A1 | 9/2003 |
| WO | 2004/036772 | A2 | 4/2004 |
| WO | 2004/070879 | A | 8/2004 |
| WO | 2004/072892 | A2 | 8/2004 |
| WO | 2005/073937 | A | 8/2005 |
| WO | 2005/091434 | A1 | 9/2005 |
| WO | 2005/115849 | A1 | 12/2005 |
| WO | 2006/045682 | A | 5/2006 |
| WO | 2006/048663 | A1 | 5/2006 |
| WO | 2006/049068 | A1 | 5/2006 |
| WO | 2006/114821 | A1 | 11/2006 |
| WO | 2007/083574 | A1 | 7/2007 |

(56) References Cited

FOREIGN PATENT DOCUMENTS

| | | | | |
|---|---|---|---|---|
| WO | 2007/083575 A1 | 7/2007 | | |
| WO | 2007/086130 A1 | 8/2007 | | |
| WO | 2007/094494 A1 | 8/2007 | | |
| WO | 2007/097385 A1 | 8/2007 | | |
| WO | 2007/102360 A1 | 9/2007 | | |
| WO | 2007/105348 A1 | 9/2007 | | |
| WO | 2007/119310 A1 | 10/2007 | | |
| WO | 2007/125683 A1 | 11/2007 | | |
| WO | 2007/132094 A1 | 11/2007 | | |
| WO | 2007/138857 A1 | 12/2007 | | |
| WO | 2008/007606 A | 1/2008 | | |
| WO | 2008/081699 A1 | 7/2008 | | |
| WO | 2008/126458 A1 | 10/2008 | | |
| WO | 2008/133018 A1 | 11/2008 | | |
| WO | 2008/140037 A1 | 11/2008 | | |
| WO | 2008/142957 A1 | 11/2008 | | |
| WO | 2009/008296 A1 | 1/2009 | | |
| WO | 2009/011144 A1 | 1/2009 | | |
| WO | 2009/011154 A1 | 1/2009 | | |
| WO | 2009/011376 A1 | 1/2009 | | |
| WO | 2009/011400 A1 | 1/2009 | | |
| WO | 2009/011423 A1 | 1/2009 | | |
| WO | 2009/048767 A1 | 4/2009 | | |
| WO | 2009/081719 A1 | 7/2009 | | |
| WO | 2009/110381 A1 | 9/2009 | | |
| WO | 2009/119548 A1 | 10/2009 | | |
| WO | 2009/128437 A1 | 10/2009 | | |
| WO | 2009/140220 A1 | 11/2009 | | |
| WO | 2010/026939 A1 | 3/2010 | | |
| WO | 2010/050361 A1 | 5/2010 | | |
| WO | WO 2010050361 A1 * | 5/2010 | ............... | H01Q 1/38 |
| WO | 2010/079830 A1 | 7/2010 | | |

OTHER PUBLICATIONS

Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official Communication issued in International Patent Application No. PCT/JP2008/063025, mailed on Aug. 12, 2008.
Kato et al.: "Wireless IC Device,"; U.S. Appl. No. 12/603,608, filed Oct. 22, 2009.
Kato et al.: "Wireless IC Device,"; U.S. Appl. No. 12/688,072, filed Jan. 15, 2010.
Official Communication issued in International Patent Application No. PCT/JP2009/053693, mailed on Jun. 9, 2009.
Kato: "Composite Antenna,"; U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System,"; U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device,"; U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device,"; U.S. Appl. No. 12/861,945, filed Aug. 24, 2010.
Kato: "Wireless IC Device and Electromagnetic Coupling Module,"; U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device"; U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/057668, mailed on Aug. 17, 2010.
Dokai et al.: "Optical Disc"; U.S. Appl. No. 13/295,153, filed Nov. 14, 2011.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.

(56) References Cited

OTHER PUBLICATIONS

Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Kato: "Wireless IC Device"; U.S. Appl. No. 12/789,610, filed May 28, 2010.
Kato: "Antenna and RFID Device"; U.S. Appl. No. 13/472,520, filed May 16, 2012.
Kato et al.: "Wireless IC Device and Component for Wireless IC Device"; U.S. Appl. No. 13/540,694, filed Jul. 3, 2012.
Dokai et al.: "Wireless IC Device and Component for Wireless IC Device"; U.S. Appl. No. 13/567,108, filed Aug. 6, 2012.
Dokai et al.: "Wireless IC Device and Component for Wireless IC Device"; U.S. Appl. No. 13/567,109, filed Aug. 6, 2012.
Official Communication issued in International Patent Application No. PCT/JP2011/052594, mailed on May 17, 2011.
Kato et al.: "Wireless IC Device"; U.S. Appl. No. 13/585,866, filed Aug. 15, 2012.
Kato et al.: "Radio Communication Device and Radio Communication Terminal"; U.S. Appl. No. 13/600,256, filed Aug. 31, 2012.
Murayama et al.: "Wireless Communication Module and Wireless Communication Device"; U.S. Appl. No. 13/598,872, filed Aug. 30, 2012.
Official Communication issued in International Patent Application No. PCT/JP2011/069689, mailed on Oct. 4, 2011.
Official Communication issued in corresponding Japanese Patent Application No. 2011-552116, mailed on Apr. 17, 2012.
Tsubaki et al.: "RFID Module and RFID Device"; U.S. Appl. No. 13/603,627, filed Sep. 5, 2012.
Kato et al.: "Antenna Device and Method of Setting Resonant Frequency of Antenna Device"; U.S. Appl. No. 13/604,807, filed Sep. 6, 2012.
Kato et al.: "Antenna Device and Method of Setting Resonant Frequency of Antenna Device"; U.S. Appl. No. 13/604,801, filed Sep. 6, 2012.
Official Communication issued in International Patent Application No. PCT/JP2011/053656, mailed on May 17, 2011.
Official Communication issued in International Patent Application No. PCT/JP2011/068110, mailed on Sep. 20, 2011.
Dokai et al.: "Antenna and Wireless Communication Device"; U.S. Appl. No. 13/613,021, filed Sep. 13, 2012.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module,"; U.S. Appl. No. 12/536,663, filed Aug. 6, 2009.
Osamura et al.: "Packaging Material With Electromagnetic Coupling Module,"; U.S. Appl. No. 12/536,669, filed Aug. 6, 2009.
Dokai et al.: "Wireless IC Device and Component for Wireless IC Device,"; U.S. Appl. No. 12/543,553, filed Aug. 19, 2009.
Shioya et al.: "Wireless IC Device,"; U.S. Appl. No. 12/551,037, filed Aug. 31, 2009.
Ikemoto: "Wireless IC Device and Manufacturing Method Thereof,"; U.S. Appl. No. 12/579,672, filed Oct. 15, 2009.
Official communication issued in International Application No. PCT/JP2008/058614, mailed on Jun. 10, 2008.
Official communication issued in counterpart International Application No. PCT/JP2008/071502, mailed Feb. 24, 2009.
Kato et al.: "Wireless IC Device and Manufacturing Method Thereof,"; U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device,"; U.S. Appl. No. 12/469,896, filed May 21, 2009.
Ikemoto et al.: "Wireless IC Device,"; U.S. Appl. No. 12/496,709, filed Jul. 2, 2009.
Official communication issued in counterpart International Application No. PCT/JP2008/062947, mailed Aug. 19, . 2008.
Official communication issued in counterpart International Application No. PCT/JP2008/055567, mailed May 20, 2008.
Ikemoto et al.: "Wireless IC Device and Electronic Appartus,"; U.S. Appl. No. 12/503,188, filed Jul. 15, 2009.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device,"; U.S. Appl. No. 12/510,338, filed Jul. 28, 2009.
Kato et al.: "Wireless IC Device,"; U.S. Appl. No. 12/510,340, filed Jul. 28, 2009.
Kato: "Wireless IC Device,"; U.S. Appl. No. 12/510,344, filed Jul. 28, 2009.
Kato et al.: "Wireless IC Device,"; U.S. Appl. No. 12/510,347, filed Jul. 28, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117. filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.

(56) References Cited

OTHER PUBLICATIONS

English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed on Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "Radio Frequency IC Device"; U.S. Appl. No. 13/163,803, filed Jun. 20, 2011.
Dokai et al.: "Wireless IC Device"; U.S. Appl. No. 13/099,392, filed May 3, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.: "Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.

* cited by examiner

PRINTED WIRING BOARD AND WIRELESS COMMUNICATION SYSTEM

BACKGROUND OF THE INVENTION

1. Field of the Invention

The present invention relates to a printed wiring board and a wireless communication system, and in particular, relates to a printed wiring board and a wireless communication system, preferably for use in an RFID (Radio Frequency Identification) system.

2. Description of the Related Art

In recent years, as an information management system for articles, there has been put into practical use an RFID system where communication is established between a reader/writer generating an induction magnetic field and an RFID tag attached to an article on the basis of a non-contact method utilizing an electromagnetic field and predetermined information is transmitted. This RFID tag includes a wireless IC chip storing therein the predetermined information and processing a predetermined wireless signal and an antenna (radiator) performing transmission and reception of a high-frequency signal.

In some cases, the RFID system is used for information management for printed wiring boards embedded in various kinds of electronic devices. For example, in International Publication No. WO 2009/011144 or International Publication No. WO 2009/011154, an RFID tag is disclosed that utilizes, as an antenna, the ground electrode of a printed wiring board. In this RFID tag, a loop-shaped electrode for matching impedance is provided between a wireless IC chip and a ground electrode. Therefore, it is possible to realize an RFID tag having a simple configuration and a small signal loss.

Incidentally, while the RFID tag described in International Publication No. WO 2009/011144 or International Publication No. WO 2009/011154 has a simple configuration, the ground electrode functioning as an antenna becomes a barrier to signal transmission and reception, and the radiation characteristic of a high-frequency signal is not necessarily good.

SUMMARY OF THE INVENTION

Therefore, preferred embodiments of the present invention provide a printed wiring board and a wireless communication system, each of which has a simple configuration and a good radiation characteristic and is suitable for an RFID system.

A printed wiring board according to a first preferred embodiment of the present invention includes a wireless IC element configured to process a high-frequency signal, a circuit substrate in which the wireless IC element is mounted, a loop-shaped electrode configured to be coupled to the wireless IC element, a radiator configured to be coupled to the loop-shaped electrode, and an auxiliary electrode configured to be coupled to the loop-shaped electrode and/or the radiator.

A wireless communication system according to a second preferred embodiment of the present invention includes the above-mentioned printed wiring board.

In the above-mentioned printed wiring board, the wireless IC element is coupled to the radiator through the loop-shaped electrode, and the radiator functions as an antenna. Furthermore, the wireless IC element is also coupled to the auxiliary electrode through the loop-shaped electrode and/or the radiator, and the auxiliary electrode also functions as an antenna. In this case, the loop-shaped electrode functions as an impedance-matching circuit with respect to the radiator and the auxiliary electrode. More specifically, a high-frequency signal is received in the auxiliary electrode in addition to the radiator, and the wireless IC element operates through the loop-shaped electrode, such that a response signal from the corresponding wireless IC element is radiated from the radiator and the auxiliary electrode to the outside through the loop-shaped electrode. The auxiliary electrode is provided, and hence, the radiation characteristics (a radiation gain and directivity) of a high-frequency signal are greatly improved.

According to various preferred embodiments of the present invention, it is possible to provide a printed wiring board including a simple configuration and an antenna with an excellent radiation characteristic, and the corresponding printed wiring substrate may be suitable for use in an RFID system, for example.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of a printed wiring board and a wireless communication system according to the present invention will be described with reference to accompanying drawings. In addition, in each drawing, a same symbol will be assigned to a common component or a common portion, and the redundant description thereof well be omitted.

First Preferred Embodiment

Figure 1:
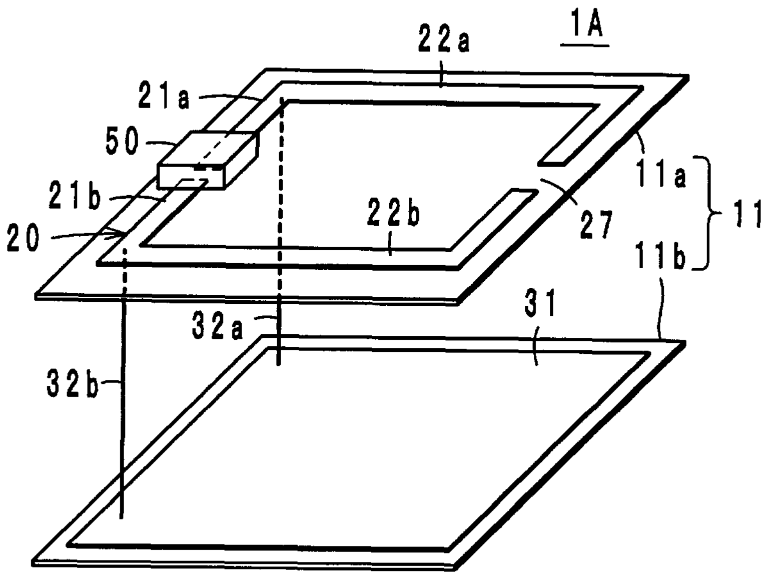
FIG. 1 is a perspective view illustrating a printed wiring board according to a first preferred embodiment of the present invention.

As illustrated in FIG. 1, a printed wiring board 1A according to a first preferred embodiment of the present invention includes a circuit substrate 11 in which two insulating sheets 11*a* and 11*b* (and a plurality of sheets not illustrated, if necessary or desired) are laminated. On the sheet 11*a*, first planar conductors 21*a* and 21*b* and second planar conductors 22*a* and 22*b* are located, and the terminal electrodes of a wireless IC element 50 are electrically connected to ends of the first planar conductors 21*a* and 21*b*, which face each other. A radiator 31 having a wide area is located on the sheet 11*b*.

The other end portions of the first planar conductors 21*a* and 21*b* and two corner portions of the radiator 31 are electrically connected to each other through via hole conductors 32*a* and 32*b*. A loop-shaped electrode 20 is defined by the first planar conductors 21*a* and 21*b*, the via hole conductors 32*a* and 32*b*, and one side of the radiator 31. The second planar conductors 22*a* and 22*b* extend from the other end portions of the first planar conductors 21*a* and 21*b* preferably in L-shaped or substantially L-shaped configurations along the side surface of the sheet 11*a*, end portions thereof face each other through a slit 27, and the second planar conductors 22*a* and 22*b* function as auxiliary electrodes.

The wireless IC element 50 processes a high-frequency signal, and the detail thereof will be described in detail with reference to FIG. 7 to FIG. 10.

In the printed wiring board 1A having the above-mentioned configuration, as the loop-shaped electrode 20, the first planar conductors 21*a* and 21*b* are coupled to the radiator 31 and the second planar conductors 22*a* and 22*b*. Therefore, a high-frequency signal, radiated from a reader/writer in an RFID system and received in the radiator 31 and the second planar conductors 22*a* and 22*b*, is supplied to the wireless IC element through the first planar conductors 21*a* and 21*b*, and the wireless IC element 50 operates. On the other hand, a response signal from the wireless IC element 50 is transmitted to the radiator 31 and the second planar conductors 22*a* and 22*b* through the first planar conductors 21*a* and 21*b* and radiated to the reader/writer.

The loop-shaped electrode 20 functions as a matching circuit for impedance, by causing the wireless IC element 50 and the radiator 31 to be coupled to each other, and functions as a matching circuit for impedance, by causing the wireless IC element 50 and the second planar conductors 22*a* and 22*b* to be coupled to each other. It is possible for the first planar conductors 21*a* and 21*b* to achieve impedance matching, by adjusting the electrical lengths thereof, the electrode widths thereof, or the like. In addition, so as to obtain a maximum radiation characteristic, it is desirable that the total length of the first planar conductor 21*a* plus the second planar conductor 22*a* and the total length of the first planar conductor 21*b* plus the second planar conductor 22*b* preferably are approximately $\lambda/4$ with respect to wavelength $\lambda$ of a communication frequency, for example.

In addition, the second planar conductors 22*a* and 22*b* extend along the edge portion of the radiator 31, and are capacitively coupled to the radiator 31 in a lamination direction. In this way, the second planar electrodes 22*a* and 22*b* functioning as auxiliary electrodes are capacitively coupled to the edge portion of the radiator 31, in which a high-frequency signal intensively flows owing to an edge effect, and hence, while it is possible to cause the radiator 31 to have directivity in the normal direction of the main surface of the radiator 31, it is possible to cause the second planar electrodes 22*a* and 22*b* to function as a matching circuit. In particular, when the length of each of the second planar conductors 22*a* and 22*b* is less than or equal to approximately $\lambda/4$, for example, a communication distance also becomes long. In addition, such an advantageous effect is true for a second preferred embodiment, a third preferred embodiment, and a fourth preferred embodiment, described later.

Figure 11:
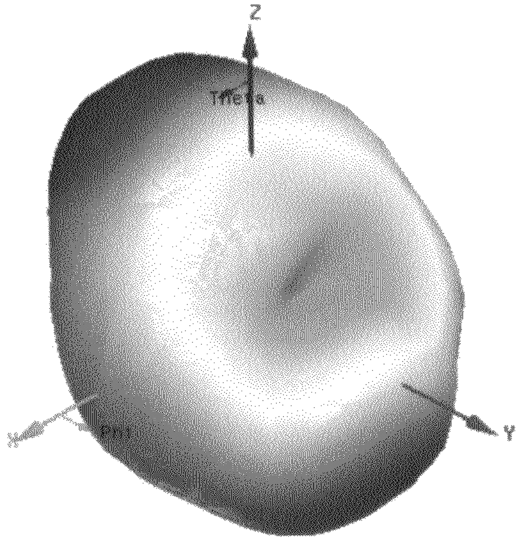
FIG. 11 is a pattern diagram illustrating a radiation electric field intensity in the first preferred embodiment of the present invention.

In the printed wiring substrate 1A according to the first preferred embodiment, a radiation electric field intensity schematically illustrated in FIG. 11 is obtained. In addition, a communication distance in a 750 MHz to 1050 MHz band is as illustrated in FIG. 16 plotted with black quadrangles.

Figure 15:
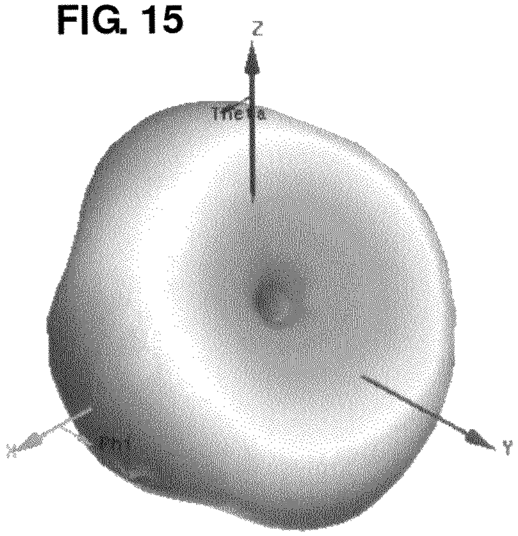
FIG. 15 is a pattern diagram illustrating a radiation electric field intensity in a comparative example.
Figure 16:
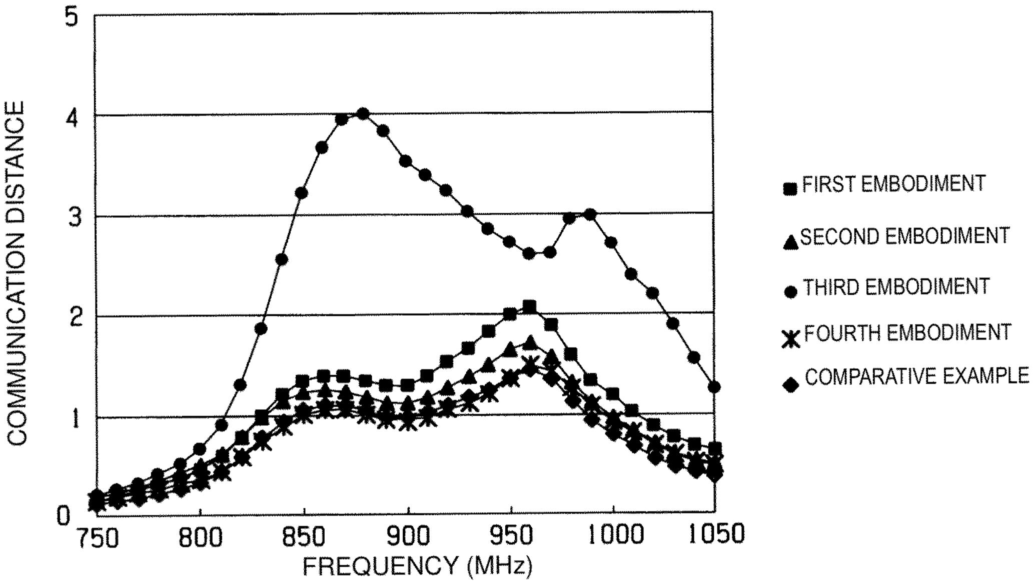
FIG. 16 is a graph illustrating a communication distance in a predetermined frequency band in each of the first to fourth preferred embodiments of the present invention and the comparative example.

Incidentally, as a comparative example, FIG. 15 illustrates the radiation electric field intensity of a printed wiring board where only the second planar conductors 22*a* and 22*b* are omitted, and a communication distance in the same frequency band is illustrated in FIG. 16 plotted with black rhombuses. In the present first preferred embodiment, compared with the comparative example, a radiation gain is enhanced and a directional characteristic is improved.

Second Preferred Embodiment

Figure 2:
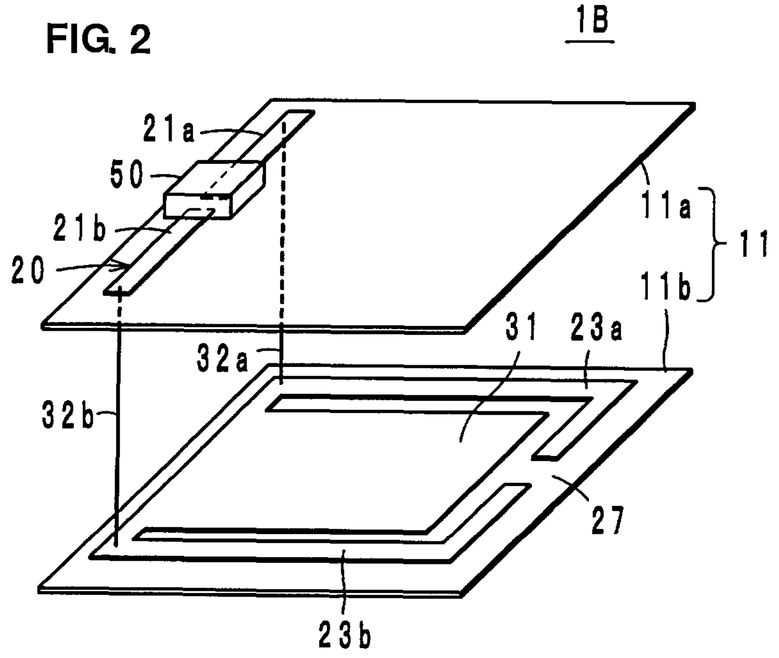
FIG. 2 is a perspective view illustrating a printed wiring board according to a second preferred embodiment of the present invention.

As illustrated in FIG. 2, a printed wiring board 1B according to a second preferred embodiment includes a circuit substrate 11 in which two insulating sheets 11*a* and 11*b* (and a plurality of sheets not illustrated, if necessary) are laminated. On the sheet 11*a*, first planar conductors 21*a* and 21*b* are located, and the terminal electrodes of the wireless IC element are electrically connected to ends of the first planar conductors 21*a* and 21*b*, which face each other. On the sheet 11*b*, a radiator 31 having a wide area and third planar conductors 23*a* and 23*b* are located.

The other end portions of the first planar conductors 21*a* and 21*b* and two corner portions of the radiator 31 are electrically connected to each other through via hole conductors 32*a* and 32*b*. A loop-shaped electrode 20 is defined by the first planar conductors 21*a* and 21*b*, the via hole conductors 32*a* and 32*b*, and one side of the radiator 31. The third planar conductors 23*a* and 23*b* extend from both end portions of the radiator 31 in L-shaped or substantially L-shaped configurations along the side surface of the sheet 11*b*, end portions thereof face each other through a slit 27, and the third planar conductors 23*a* and 23*b* function as auxiliary electrodes.

In the printed wiring board 1B having the above-mentioned configuration, as the loop-shaped electrode 20, the first planar conductors 21*a* and 21*b* are coupled to the radiator and the third planar conductors 23*a* and 23*b*. Therefore, a high-frequency signal, radiated from a reader/writer in an RFID system and received in the radiator and the third planar conductors 23*a* and 23*b*, is supplied to the wireless IC element through the first planar conductors 21*a* and 21*b*, and the wireless IC element 50 operates. On the other hand, a response signal from the wireless IC element 50 is transmitted to the radiator 31 and the third planar conductors 23*a* and 23*b* through the first planar conductors 21*a* and 21*b* and radiated to the reader/writer.

The loop-shaped electrode 20 functions as a matching circuit for impedance, by causing the wireless IC element 50 and the radiator 31 to be coupled to each other, and functions as a matching circuit for impedance, by causing the wireless IC element 50 and the third planar conductors 23*a* and 23*b* to be coupled to each other. It is possible for the first planar conductors 21*a* and 21*b* to achieve impedance matching, by adjusting the electrical lengths thereof, the electrode widths thereof, or the like. In addition, so as to obtain a maximum radiation characteristic, it is desirable that the total length of the first planar conductor 21*a*, the via hole conductor 32*a*, and the third planar conductor 23*a* and the total length of the first planar conductor 21*b*, the via hole conductor 32*b*, and the third planar conductor 23*b* preferably are approximately λ/4, for example, with respect to the wavelength λ of the communication frequency.

Figure 12:
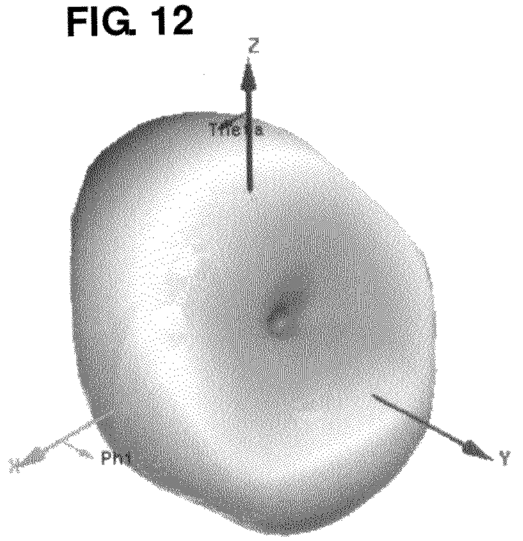
FIG. 12 is a pattern diagram illustrating a radiation electric field intensity in the second preferred embodiment of the present invention.

In the printed wiring substrate 1B according to the second preferred embodiment, a radiation electric field intensity schematically illustrated in FIG. 12 is obtained. In addition, a communication distance in a 750 MHz to 1050 MHz band is as illustrated in FIG. 16 plotted with black triangles. In the present second preferred embodiment, compared with the above-mentioned comparative example, a radiation gain is enhanced.

Third Preferred Embodiment

Figure 3:
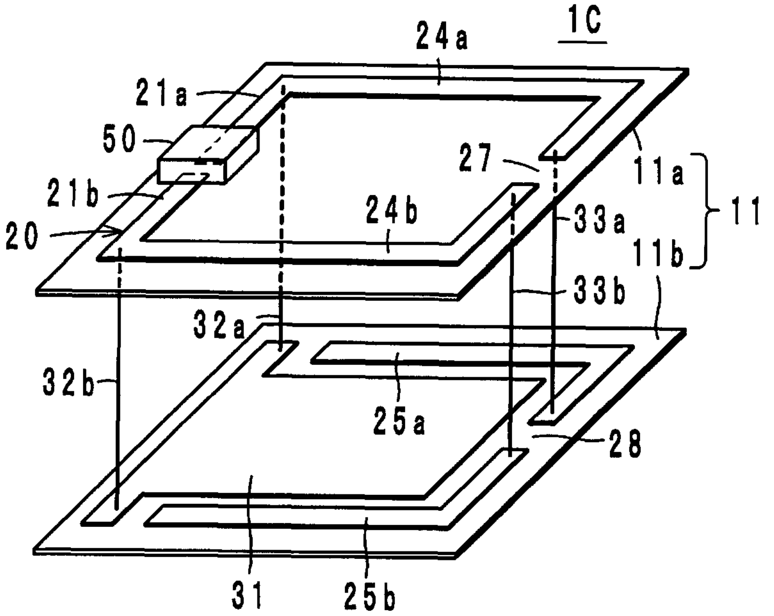
FIG. 3 is a perspective view illustrating a printed wiring board according to a third preferred embodiment of the present invention.

As illustrated in FIG. 3, a printed wiring board 1C according to a third preferred embodiment includes a circuit substrate 11 in which two insulating sheets 11*a* and 11*b* (and a plurality of sheets not illustrated, if necessary) are laminated. On the sheet 11*a*, first planar conductors 21*a* and 21*b* and fourth planar conductors 24*a* and 24*b* are located, and the terminal electrodes of the wireless IC element 50 are electrically connected to ends of the first planar conductors 21*a* and 21*b*, which face each other. On the sheet 11*b*, a radiator 31 having a wide area and fifth planar conductors 25*a* and 25*b* are located.

The other end portions of the first planar conductors 21*a* and 21*b* and two corner portions of the radiator 31 are electrically connected to each other through via hole conductors 32*a* and 32*b*. A loop-shaped electrode 20 is configured using the first planar conductors 21*a* and 21*b*, the via hole conductors 32*a* and 32*b*, and one side of the radiator 31. The fourth planar conductors 24*a* and 24*b* extend from the other end portions of the first planar conductors 21*a* and 21*b* in L-shaped or substantially L-shaped configurations along the side surface of the sheet 11*a*, end portions thereof face each other through a slit 27, and the fourth planar conductors 24*a* and 24*b* function as auxiliary electrodes. The fifth planar conductors 25*a* and 25*b* extend from both end portions of the radiator 31 in L-shaped or substantially L-shaped configurations along the side surface of the sheet 11*b*, and end portions thereof face each other through a slit 28. In addition to this, the fifth planar conductors 25*a* and 25*b* are electrically connected to the fourth planar conductors 24*a* and 24*b* through via hole conductors 33*a* and 33*b* and function as auxiliary electrodes.

In the printed wiring board 1C having the above-mentioned configuration, as the loop-shaped electrode 20, the first planar conductors 21*a* and 21*b* are coupled to the radiator 31, the fourth planar conductors 24*a* and 24*b*, and the fifth planar conductors 25*a* and 25*b*. Therefore, a high-frequency signal, radiated from a reader/writer in an RFID system and received in the radiator 31, the fourth planar conductors 24*a* and 24*b*, and the fifth planar conductors 25*a* and 25*b*, is supplied to the wireless IC element 50 through the first planar conductors 21*a* and 21*b*, and the wireless IC element 50 operates. On the other hand, a response signal from the wireless IC element 50 is transmitted to the radiator 31, the fourth planar conductors 24*a* and 24*b*, and the fifth planar conductors 25*a* and 25*b* through the first planar conductors 21*a* and 21*b* and radiated to the reader/writer.

The loop-shaped electrode 20 functions as a matching circuit for impedance, by causing the wireless IC element 50 and the radiator 31 to be coupled to each other, and functions as a matching circuit for impedance, by causing the wireless IC element 50, the fourth planar conductors 24*a* and 24*b*, and the fifth planar conductors 25*a* and 25*b* to be coupled to one another. It is possible for the first planar conductors 21*a* and 21*b* to achieve impedance matching, by adjusting the electrical lengths thereof, the electrode widths thereof, or the like. In addition, so as to obtain a maximum radiation characteristic, it is desirable that the total length of the first planar conductor 21*a*, the fourth planar conductor 24*a*, the via hole conductor 33*a*, and the fifth planar conductor 25*a* and the total length of the first planar conductor 21*b*, the fourth planar conductor 24*b*, the via hole conductor 33*b*, and the fifth planar conductor 25*b* preferably are approximately λ/4 with respect to the wavelength λ of the communication frequency, for example.

Figure 13:
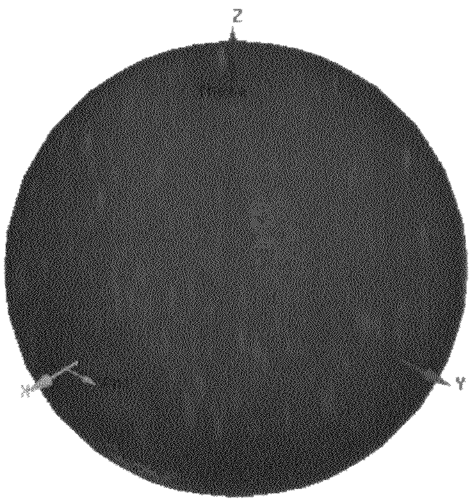
FIG. 13 is a pattern diagram illustrating a radiation electric field intensity in the third preferred embodiment of the present invention.

In the printed wiring substrate 1C according to the third preferred embodiment, a radiation electric field intensity schematically illustrated in FIG. 13 is obtained. In addition, a communication distance in a 750 MHz to 1050 MHz band is as illustrated in FIG. 16 plotted with black circles. In the present third preferred embodiment, compared with the above-mentioned comparative example, a radiation gain is enhanced and a directional characteristic is improved.

Fourth Preferred Embodiment

Figure 4:
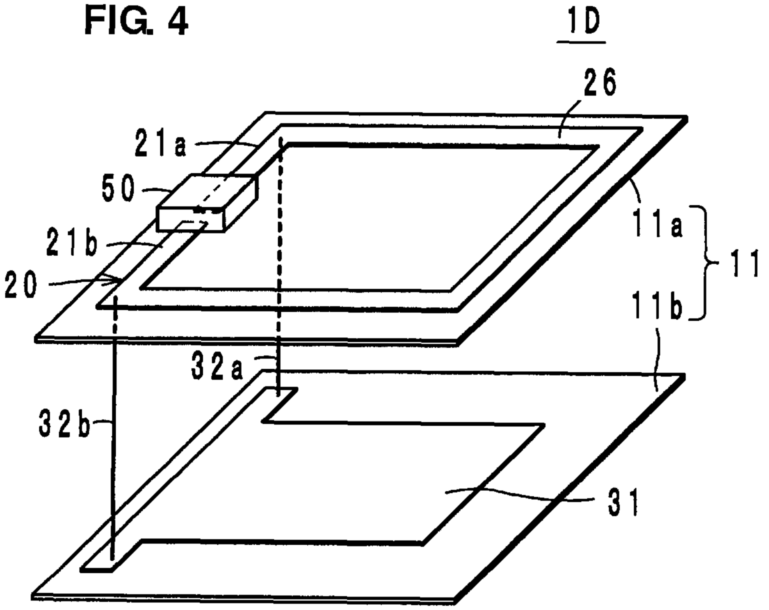
FIG. 4 is a perspective view illustrating a printed wiring board according to a fourth preferred embodiment of the present invention.

As illustrated in FIG. 4, a printed wiring board 1D according to a fourth preferred embodiment includes a circuit substrate 11 in which two insulating sheets 11*a* and 11*b* (and a plurality of sheets not illustrated, if necessary) are laminated. On the sheet 11*a*, first planar conductors 21*a* and 21*b* and a sixth planar conductor 26 are located, and the terminal electrodes of the wireless IC element 50 are electrically connected to ends of the first planar conductors 21*a* and 21*b*, which face each other. On the sheet 11*b*, a radiator 31 having a wide area is located.

The other end portions of the first planar conductors 21*a* and 21*b* and two corner portions of the radiator 31 are electrically connected to each other through via hole conductors 32*a* and 32*b*. A loop-shaped electrode 20 is defined by the first planar conductors 21*a* and 21*b*, the via hole conductors 32*a* and 32*b*, and one side of the radiator 31. The sixth planar conductor extends from the other end portions of the first planar conductors 21*a* and 21*b* along the side surface of the sheet 11*a*, is defined as one electrode having an L-shaped or substantially L-shaped configuration, and functions as an auxiliary electrode.

In the printed wiring board 1D having the above-mentioned configuration, as the loop-shaped electrode 20, the first planar conductors 21*a* and 21*b* are coupled to the radiator and the sixth planar conductor 26. Therefore, a high-frequency signal, radiated from a reader/writer in an RFID system and received in the radiator 31 and the sixth planar conductor 26, is supplied to the wireless IC element 50 through the first planar conductors 21*a* and 21*b*, and the wireless IC element

50 operates. On the other hand, a response signal from the wireless IC element 50 is transmitted to the radiator 31 and the sixth planar conductor 26 through the first planar conductors 21_a_ and 21_b_ and radiated to the reader/writer.

The loop-shaped electrode 20 functions as a matching circuit for impedance, by causing the wireless IC element 50 and the radiator 31 to be coupled to each other, and functions as a matching circuit for impedance, by causing the wireless IC element 50 and the sixth planar conductor 26 to be coupled to each other. It is possible for the first planar conductors 21_a_ and 21_b_ to achieve impedance matching, by adjusting the electrical lengths thereof, the electrode widths thereof, or the like.

Figure 14:
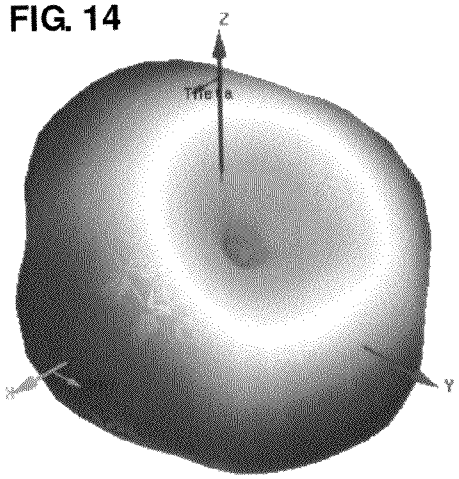
FIG. 14 is a pattern diagram illustrating a radiation electric field intensity in the fourth preferred embodiment of the present invention.

In the printed wiring substrate 1D according to the fourth preferred embodiment, a radiation electric field intensity schematically illustrated in FIG. 14 is obtained. In addition, a communication distance in a 750 MHz to 1050 MHz band is as illustrated in FIG. 16 plotted with *. In the present fourth preferred embodiment, compared with the above-mentioned comparative example, a directional characteristic is improved.

Next, a wireless communication system (RFID system) utilizing the above-mentioned printed wiring board 1A will be described. In addition, it is clear that it is possible to use the printed wiring boards 1B to 1D.

Figure 5:
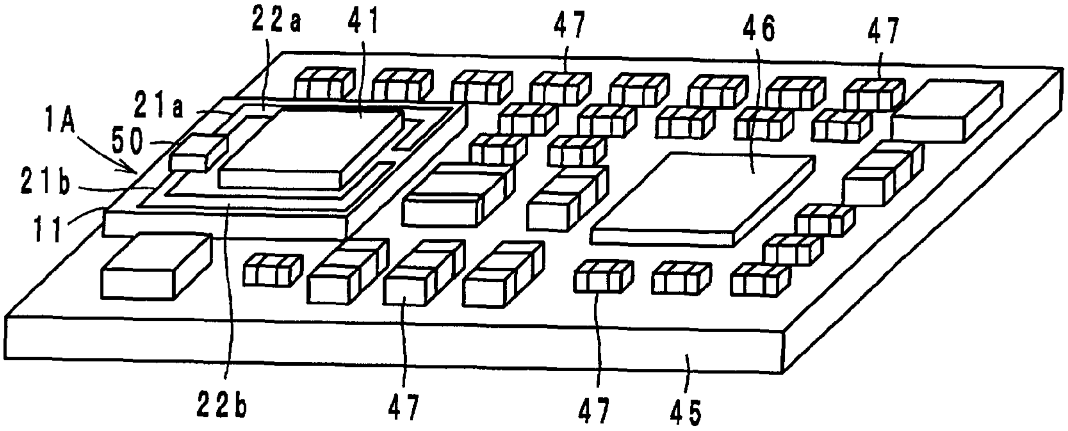
FIG. 5 is a perspective view illustrating a state where a printed wiring board is mounted in a mother substrate.

As illustrated in FIG. 5, in the printed wiring board 1A, an IC circuit component 41 is mounted in the inner region of the second planar conductors 22_a_ and 22_b_, and the printed wiring board 1A is mounted on a mother substrate 45. The mother substrate 45 is preferably built into an electronic device such as a computer, and a number of an IC circuit component 46, a chip type electronic component 47, and the like are mounted in the mother substrate 45.

Figure 6:
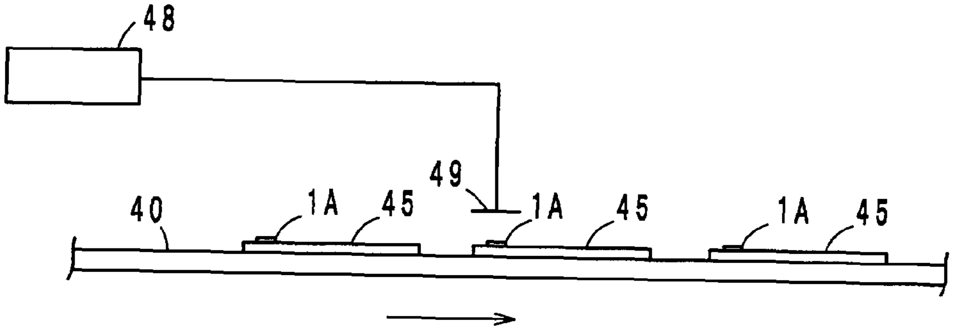
FIG. 6 is a schematic configuration diagram of an RFID system utilizing a printed wiring substrate.

The printed wiring board 1A capable of establishing communication with a reader/writer is preferably mounted in the mother substrate 45, and hence, it is possible to manage the mother substrate 45 on the basis of various types of information stored in the wireless IC element 50, at the manufacturing stage of the mother substrate 45 or in the storage management thereof. As illustrated in FIG. 6, when the mother substrates 45 equipped with the printed wiring boards 1A are placed on a conveyor 40 and sequentially carried on a production line, the mother substrate 45 passes below an antenna 49 connected to a processing circuit 48 in the reader/writer or the antenna 49 is put close to the intended mother substrate 45, thereby allowing the processing circuit 48 to acquire necessary information.

Figure 7:
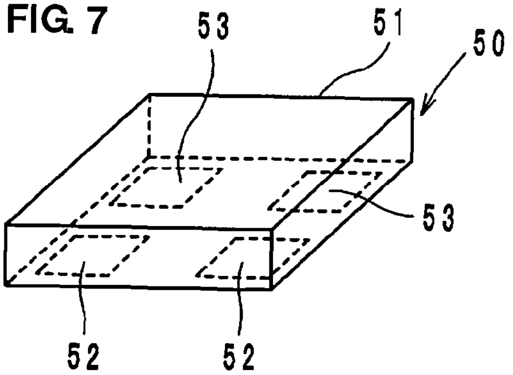
FIG. 7 is a perspective view illustrating a wireless IC chip as a wireless IC element.
Figure 8:
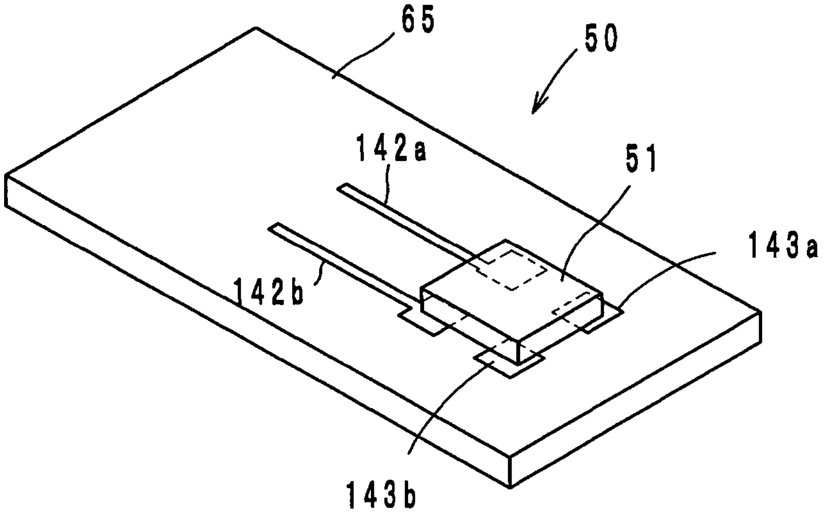
FIG. 8 is a perspective view illustrating a state where a wireless IC chip is mounted, as a wireless IC element, on a feeder circuit substrate.
Figure 9:
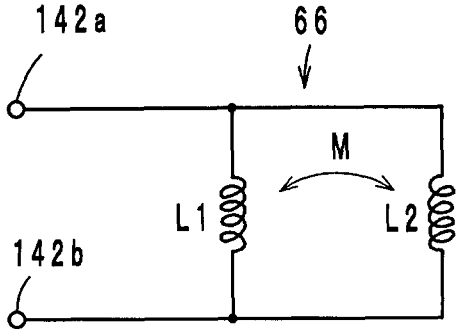
FIG. 9 is an equivalent circuit diagram illustrating an example of a feeder circuit.

As illustrated in FIG. 7, the wireless IC element 50 may also be a wireless IC chip 51 processing a high-frequency signal, and alternatively, as illustrated in FIG. 8, the wireless IC element 50 may also include the wireless IC chip 51 and a feeder circuit substrate 65 including a resonant circuit having a predetermined resonance frequency.

The wireless IC chip 51 illustrated in FIG. 7 includes a clock circuit, a logic circuit, a memory circuit, and the like, and stores therein necessary information. In the back surface of the wireless IC chip 51, input-output terminal electrodes 52 and 52 and mounting terminal electrodes 53 and 53 are provided. The input-output terminal electrodes 52 and 52 are electrically connected to the above-mentioned first planar conductors 21_a_ and 21_b_ through metal bumps or other suitable members. In addition, Au, solder, or the like may be used as the material of the metal bump.

When, as illustrated in FIG. 8, the wireless IC element 50 is configured using the wireless IC chip 51 and the feeder circuit substrate 65, it is possible to provide various types of feeder circuits (including a resonant circuit/matching circuit) in the feeder circuit substrate 65. For example, as illustrated as an equivalent circuit in FIG. 9, the feeder circuit may be a feeder circuit 66 including inductance elements L1 and L2, which have inductance values different from each other and are magnetically coupled to each other (indicated by mutual inductance M) with an opposite phase. The feeder circuit has a predetermined resonance frequency, and achieves impedance matching between the impedance of the wireless IC chip 51 and a radiator or the like. In addition, the wireless IC chip and the feeder circuit 66 may be electrically connected to each other (e.g., through a DC connection) or coupled to each other through an electromagnetic field.

The feeder circuit 66 transmits a high-frequency signal, which is sent out from the wireless IC chip 51 and has a predetermined frequency, to a radiator or the like through the above-mentioned loop-shaped electrode, and supplies a high-frequency signal received in the radiator or the like to the wireless IC chip 51 through the loop-shaped electrode. Since the feeder circuit 66 has the predetermined resonance frequency, it is easy to achieve impedance matching with the radiator or the like and it is possible to shorten the electrical length of the loop-shaped electrode.

Next, the configuration of the feeder circuit substrate 65 will be described. As illustrated in FIG. 7 and FIG. 8, the input-output terminal electrodes 52 of the wireless IC chip 51 are connected to feeding terminal electrodes 142_a_ and 142_b_ located on the feeder circuit substrate 65 and the mounting terminal electrodes 53 thereof are connected to mounting terminal electrodes 143_a_ and 143_b_, through metal bumps or the like.

Figure 10:
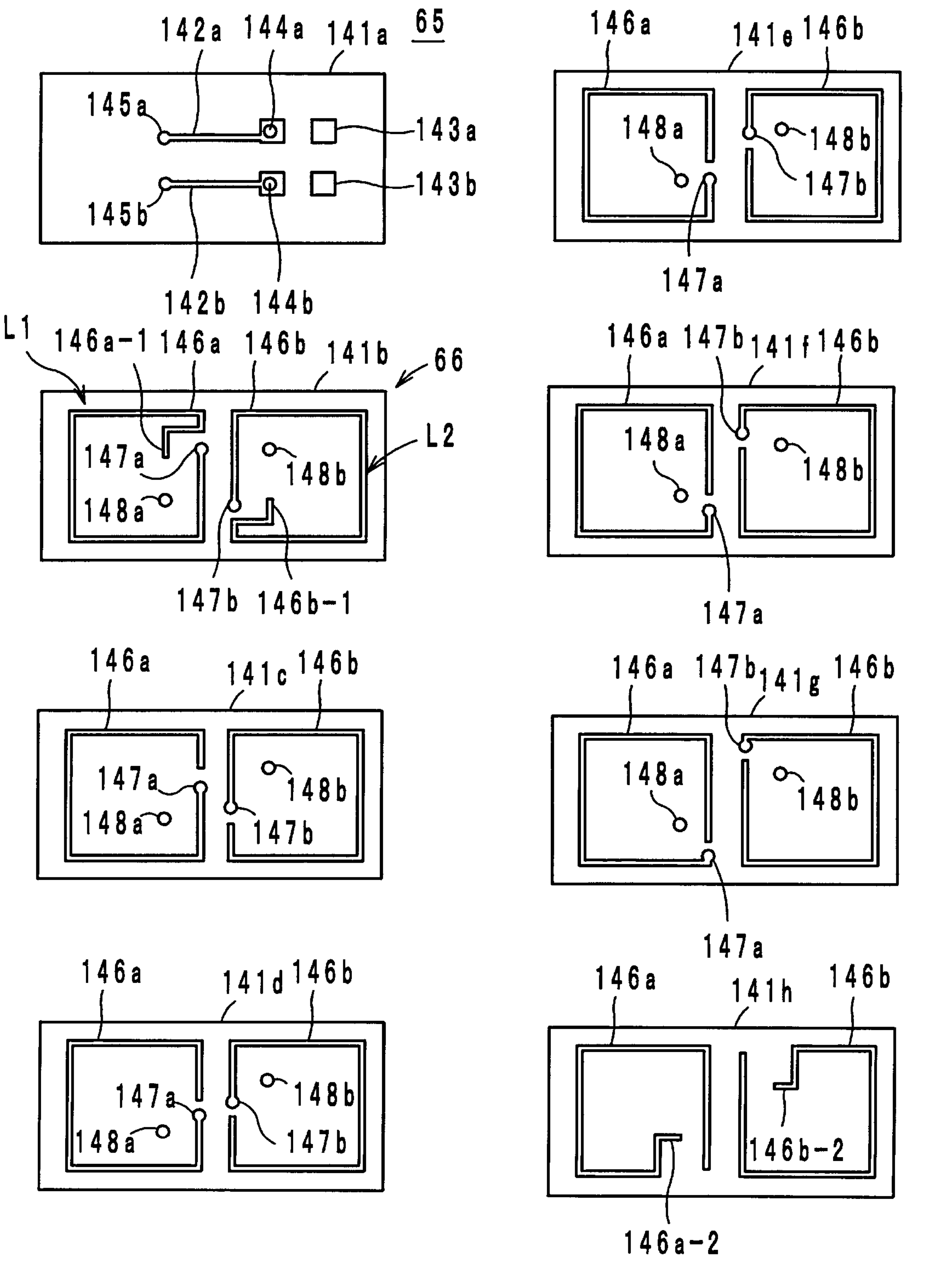
FIG. 10 is a plan view illustrating a laminated structure of the above-mentioned feeder circuit substrate.

As illustrated in FIG. 10, the feeder circuit substrate 65 is obtained by lamination, pressure-bonding, and firing ceramic sheets 141_a_ to 141_h_ including dielectric or magnetic bodies. In this regard, however, insulation layers configuring the feeder circuit substrate 65 are not limited to the ceramic sheets, and, for example, may also be thermosetting resin such as liquid crystal polymer or resin sheets such as thermoplastic resins. On the sheet 141_a_ at an uppermost layer, the feeding terminal electrodes 142_a_ and 142_b_, the mounting terminal electrodes 143_a_ and 143_b_, and via hole conductors 144_a_, 144_b_, 145_a_, and 145_b_ are located. On each of the sheets 141_b_ to 141_h_ in the second layer to the eighth layer, wiring electrodes 146_a_ and 146_b_ are arranged to configure the inductance elements L1 and L2 and via hole conductors 147_a_, 147_b_, 148_a_, and 148_b_ are formed, if necessary or desired.

By laminating the above-mentioned sheets 141_a_ to 141_h_, the inductance element L1 is provided such that the wiring electrode 146_a_ is connected in a spiral shape owing to the via hole conductor 147_a_, and the inductance element L2 is provided such that the wiring electrode 146_b_ is connected in a spiral shape owing to the via hole conductor 147_b_. In addition, capacitance is generated between the lines of the wiring electrodes 146_a_ and 146_b_.

An end portion 146_a_-1 of the wiring electrode 146_a_ on the sheet 141_b_ is connected to the feeding terminal electrode 142_a_ through the via hole conductor 145_a_, and an end portion 146_a_-2 of the wiring electrode 146_a_ on the sheet 141_h_ is connected to the feeding terminal electrode 142_b_ through the via hole conductors 148_a_ and 145_b_. An end portion 146_b_-1 of the wiring electrode 146_b_ on the sheet 141_b_ is connected to the feeding terminal electrode 142_b_ through the via hole conductor 144_b_, and an end portion 146_b_-2 of the wiring electrode 146_b_ on the sheet 141_h_ is connected to the feeding terminal electrode 142_a_ through the via hole conductors 148_b_ and 144_a_.

In the above-mentioned feeder circuit 66, since the inductance elements L1 and L2 are wound in directions opposite to each other, magnetic fields generated in the inductance elements L1 and L2 cancel each other out. Since the magnetic fields cancel each other out, it is necessary to lengthen the wiring electrodes 146*a* and 146*b* to some extent, so as to obtain a desired inductance value. Since this results in lowering a Q value, the steepness of a resonance characteristic disappears. Therefore, a wider bandwidth is obtained in the vicinity of a resonance frequency.

When the perspective plane of the feeder circuit substrate 65 is seen, the inductance elements L1 and L2 are provided at left and right different positions. In addition, the directions of the magnetic fields generated in the inductance elements L1 and L2 are opposite to each other. Therefore, when the feeder circuit 66 is coupled to the loop-shaped electrode 20, a reversed current is excited in the loop-shaped electrode 20, and it is possible to cause a current to be generated in the radiator 31 and the second planar conductors 22*a* and 22*b*. Accordingly, due to a potential difference due to the current, it is possible to cause the radiator 31 and the second planar conductors 22*a* and 22*b* to operate as an antenna.

By incorporating a resonance/matching circuit in the feeder circuit substrate 65, it is possible to significantly reduce and prevent a characteristic fluctuation due to an external article, and it is possible to prevent a communication quality from being deteriorated. In addition, if the wireless IC chip 51 configuring the wireless IC element 50 is disposed so as to face toward a center side in the thickness direction of the feeder circuit substrate 65, it is possible to prevent the wireless IC chip 51 from being destroyed and it is possible to enhance a mechanical strength as the wireless IC element 50.

Additional Preferred Embodiments

In addition, a printed wiring board and a wireless communication system according to the present invention are not limited to the above-mentioned preferred embodiments, and it should be understood that various modifications may occur insofar as they are within the scope thereof.

Figure 17A:
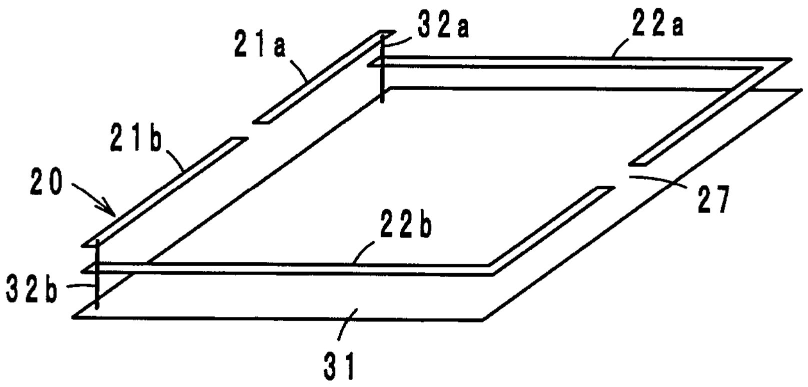
FIG. 17A is a perspective view illustrating a first example of a modification of a preferred embodiment of the present invention.

FIG. 17A illustrates a first example of a modification of a preferred embodiment of the present invention. In this first example of a modification of a preferred embodiment of the present invention, the second planar conductors 22*a* and 22*b* are provided on an intermediate layer located between the first planar conductors 21*a* and 21*b* and the radiator 31, and ends of the second planar conductors 22*a* and 22*b* are connected to the via hole conductors 32*a* and 32*b*.

Figure 17B:
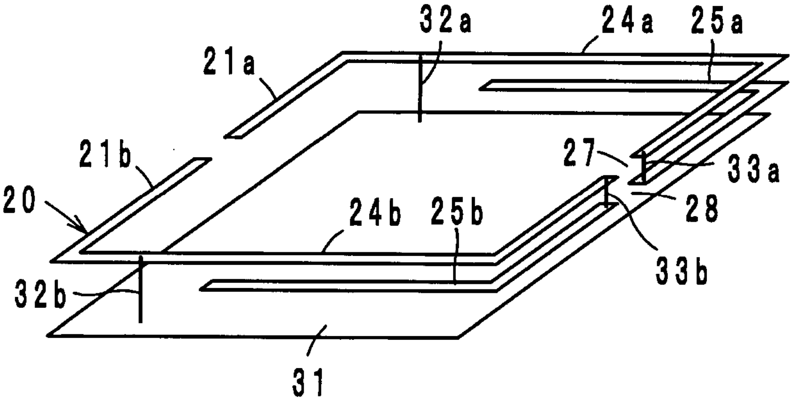
FIG. 17B is a perspective view illustrating a second example of a modification of a preferred embodiment of the present invention.

FIG. 17B illustrates a second example of a modification of a preferred embodiment of the present invention. In this second example of a modification of a preferred embodiment of the present invention, the fifth planar conductors 25*a* and 25*b* are provided on an intermediate layer located between the first planar conductors 21*a* and 21*b* and the radiator 31, and the other ends of the fourth planar conductors 24*a* and 24*b* connected to the first planar conductors 21*a* and 21*b* are connected to the other ends of the fifth planar conductors 25*a* and 25*b* through the via hole conductors 33*a* and 33*b*.

Figure 17C:
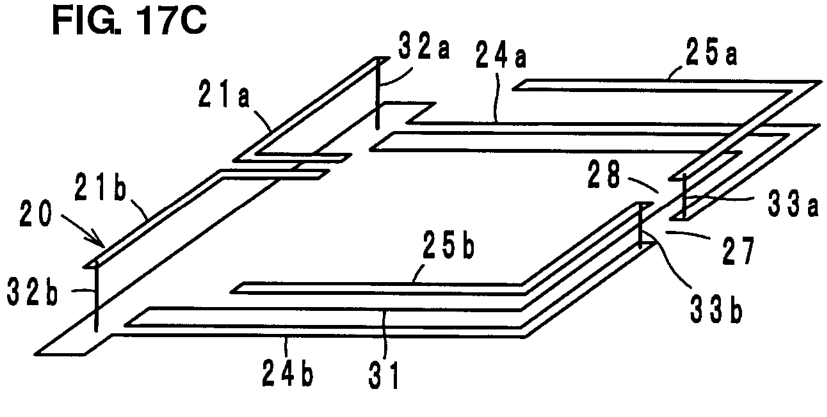
FIG. 17C is a perspective view illustrating a third example of a modification of the present invention.

FIG. 17C illustrates a third example of a modification of a preferred embodiment of the present invention. In this third example of a modification of a preferred embodiment of the present invention, the fourth planar conductors 24*a* and 24*b* are provided on the same layer as the radiator 31, ends thereof are connected to the radiator 31 and the via hole conductors 32*a* and 32*b*, the fifth planar conductors 25*a* and 25*b* are provided on an intermediate layer located between the first planar conductors 21*a* and 21*b* and the radiator 31, and the other ends of the fourth planar conductors 24*a* and 24*b* are connected to the other ends of the fifth planar conductors 25*a* and 25*b* through the via hole conductors 33*a* and 33*b*.

As described above, preferred embodiments of the present invention are useful for a printed wiring board and a wireless communication system, for example, and in particular, preferred embodiments of the present invention have a simple configuration and are superior in terms of an excellent radiation characteristic.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printed wiring board comprising:

a wireless IC element configured to process a high-frequency signal;

a circuit substrate including at least two stacked insulating sheets, wherein the wireless IC element is mounted;

a loop-shaped electrode connected to the wireless IC element, mounted on one of the insulating sheets, and in or on and across the circuit substrate;

a planar-shaped radiator mounted in or on another one of said insulating sheets and connected to the loop-shaped electrode; and a line-shaped auxiliary electrode mounted in or on said another one of said insulating sheets and connected to at least one of the loop-shaped electrode and the planar-shaped radiator; wherein the line-shaped auxiliary electrode is provided along an edge portion of the circuit substrate so as to at least partially surround the planar-shaped radiator in plan view;

the planar-shaped radiator and the line-shaped auxiliary electrode functions as an antenna; and the loop-shaped electrode function as an impedance matching circuit for the planar-shaped radiator and the line-shaped auxiliary electrode to enhance the radiation gain and improve directional characteristics of the antenna.

2. The printed wiring board according to claim 1, wherein the line-shaped auxiliary electrode extends along an edge portion of the planar-shaped radiator and is capacitively coupled to the planar-shaped radiator.

3. The printed wiring board according to claim 1, wherein the wireless IC element and the planar-shaped radiator are provided on respective different layers of the circuit substrate;

the loop-shaped electrode includes a first planar conductor, provided on a layer on which the wireless IC element is provided, and connected to a terminal of the wireless IC element, and a first interlayer conductor connecting the first planar conductor and the planar-shaped radiator to each other; and the line-shaped auxiliary electrode includes a second planar conductor connected to the first planar conductor or the first interlayer conductor.

4. The printed wiring board according to claim 1, wherein the wireless IC element and the planar-shaped radiator are provided on respective different layers of the circuit substrate;

the loop-shaped electrode includes a first planar conductor, provided on a layer on which the wireless IC element is provided, and connected to a terminal of the wireless IC element, and an interlayer conductor connecting the first planar conductor and the planar-shaped radiator to each other;

the line-shaped auxiliary electrode includes a second planar conductor provided on a layer different from the layer on which the wireless IC element is provided; and the third planar conductor is connected to the planar-shaped radiator.

5. The printed wiring board according to claim 1, wherein the wireless IC element and the planar-shaped radiator are provided on respective different layers of the circuit substrate;

the loop-shaped electrode includes a first planar conductor, provided on the layer on which the wireless IC element is provided, and connected to a terminal of the wireless IC element, and a first interlayer conductor connecting the first planar conductor and the planar-shaped radiator to each other;

the line-shaped auxiliary electrode includes a second planar conductor, a third planar conductor provided on a layer different from the second planar conductor, and an interlayer conductor connecting the second planar conductor and the third planar conductor to each other; and the second planar conductor is connected to the first planar conductor, the first interlayer conductor, or the planar-shaped radiator.

6. The printed wiring board according to claim 1, wherein the wireless IC element and the planar-shaped radiator are provided on respective different layers of the circuit substrate;

the loop-shaped electrode includes a first planar conductor, provided on a layer in which the wireless IC element is provided, and connected to a terminal of the wireless IC element, and an interlayer conductor connecting the first planar conductor and the planar-shaped radiator to each other;

the line-shaped auxiliary electrode is provided on the layer on which the wireless IC element is provided, and includes a second planar conductor having a loop shape; and the second planar conductor is connected to the first planar conductor or the first interlayer conductor.

7. The printed wiring board according to claim 1, wherein the wireless IC element is a wireless IC chip that processes a high-frequency signal.

8. The printed wiring board according to claim 1, wherein the loop-shaped electrode matches impedance by coupling the wireless IC element and the planar-shaped radiator to each other.

9. The printed wiring board according to claim 3, wherein the loop-shaped electrode matches impedance by coupling the wireless IC element and the second planar conductor to each other.

10. The printed wiring board according to claim 3, wherein the second planar conductor is L-shaped or substantially L-shaped.

11. The printed wiring board according to claim 3, wherein a length of the second planar conductor is approximately λ/4, where λ is a wavelength of a communication frequency.

12. The printed wiring board according to claim 3, further comprising at least two first planar conductors and at least two second planar conductors, wherein a total length of a first of the at least two first planar conductors plus a second of the at least two second planar conductors and a total length of a second of the at least two first planar conductors plus a second of the at least two second planar conductors are approximately λ/4, where λ is a wavelength of a communication frequency.

13. The printed wiring board according to claim 3, wherein the printed wiring board includes a plurality of layers, and the second planar conductor is located on a layer between a layer including the first planar conductor and another layer including the planar-shaped radiator.

14. The printed wiring board according to claim 4, wherein the loop-shaped electrode matches impedance by coupling the wireless IC element and the second planar conductor to each other.

15. The printed wiring board according to claim 4, wherein the second planar conductor is L-shaped or substantially L-shaped.

16. The printed wiring board according to claim 4, further comprising:

at least two first planar conductors, at least two second planar conductors, and at least two interlayer conductors; wherein a total length of a first of the at least two first planar conductors, a first of the at least two interlayer conductors, and a first of the at least two second planar conductors, and a total length of a second of the at least two first planar conductors, a second of the at least two interlayer conductors, and a second of the at least two second planar conductors are approximately λ/4, where λ is a wavelength of a communication frequency.

17. The printed wiring board according to claim 1, wherein the wireless IC element includes a wireless IC chip that processes a high-frequency signal and a feeder circuit substrate including a feeder circuit having a predetermined resonance frequency.

18. A wireless communication system comprising the printed wiring board according to claim 1.

19. The wireless communication system according to claim 18, wherein the printed wiring board is mounted on a mother substrate.

20. The wireless communication system according to claim 18, wherein the wireless communication system is a radio frequency identification system.

* * * * *